(12) United States Patent
Frederiks et al.

(10) Patent No.: US 8,630,680 B2
(45) Date of Patent: *Jan. 14, 2014

(54) EFFICIENT WIRELESS TRANSMISSION OPPORTUNITY HANDOFF

(75) Inventors: Guido Robert Frederiks, Campbell, CA (US); Vincent K. Jones, Redwood City, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 708 days.

This patent is subject to a terminal disclaimer.

(21) Appl. No.: 12/622,097

(22) Filed: Nov. 19, 2009

(65) Prior Publication Data

US 2010/0061342 A1    Mar. 11, 2010

Related U.S. Application Data

(63) Continuation of application No. 11/378,612, filed on Mar. 18, 2006, now Pat. No. 7,639,658.

(60) Provisional application No. 60/663,567, filed on Mar. 18, 2005.

(51) Int. Cl.
  *H04M 1/00*        (2006.01)

(52) U.S. Cl.
  USPC ............... 455/552.1; 455/502; 455/556.2; 455/450; 370/331; 370/338; 370/328

(58) Field of Classification Search
  USPC .......... 455/436, 439, 437, 522, 69, 434, 438, 455/442, 440, 422.1, 560, 513, 552.1, 502, 455/556.2, 450; 370/332, 280, 331, 338, 370/252, 337, 335, 328, 311, 522, 348, 468, 370/235, 503; 704/E19.006; 380/43

See application file for complete search history.

(56) References Cited

U.S. PATENT DOCUMENTS 7,305,004 B2 *  12/2007  Sherman .................. 370/462
7,599,340 B2    10/2009  Chandra et al.
(Continued)

FOREIGN PATENT DOCUMENTS

JP      2005057373    3/2005
WO      03026215      3/2003
WO      2004102893    11/2004

OTHER PUBLICATIONS

Japanese Office Action mailed Apr. 12, 2011 for JP Patent Application Serial No. 2008-502154, 2 pages.
Chinese Office Action mailed May 3, 2011 for CN Patent Application Serial No. 200680016217.5, 2 pages.

(Continued)

*Primary Examiner* — Mahendra Patel
(74) *Attorney, Agent, or Firm* — Howard Seo

(57) ABSTRACT

Circuits, methods, and apparatus that provide high-throughput control fields that, among other functions, provide efficient TXOP handoffs in wireless networks. A handoff may be made by setting one or more bits in a field in a QoS frame, such as the HT control or other appropriate field. Various conditions may be placed on a handoff by a granting station. For example, conditions specifying where a station receiving a TXOP handoff may send data, what the receiving station may do with any remaining TXOP, or what types of data may be transmitted by the receiving station may be imposed. These various conditions may be combined or omitted in any logic combination.

32 Claims, 21 Drawing Sheets

(56) References Cited

U.S. PATENT DOCUMENTS

| | | |
|---|---|---|
| 7,611,897 B2 | 11/2009 | Chatterjee et al. |
| 7,639,658 B2 * | 12/2009 | Frederiks et al. ............. 370/338 |
| 2002/0058252 A1 | 5/2002 | Ananiev |
| 2002/0102980 A1 * | 8/2002 | Jokinen ........................ 455/450 |
| 2003/0056245 A1 | 3/2003 | Chatterjee et al. |
| 2004/0013128 A1 | 1/2004 | Moreton et al. |
| 2004/0162024 A1 * | 8/2004 | Wentink ....................... 455/41.2 |
| 2004/0233876 A1 | 11/2004 | Nakashima et al. |
| 2004/0258039 A1 * | 12/2004 | Stephens ...................... 370/349 |
| 2005/0060319 A1 | 3/2005 | Douglas et al. |
| 2005/0238016 A1 * | 10/2005 | Nishibayashi et al. ....... 370/389 |
| 2006/0056362 A1 * | 3/2006 | Jang et al. .................... 370/336 |
| 2006/0221982 A1 * | 10/2006 | Bouckaert et al. ............ 370/401 |
| 2006/0227733 A1 | 10/2006 | Frederiks et al. |
| 2007/0129018 A1 | 6/2007 | Trainin et al. |
| 2007/0171858 A1 * | 7/2007 | Grandhi et al. ............... 370/328 |
| 2008/0043872 A1 | 2/2008 | Hansen |
| 2009/0040965 A1 * | 2/2009 | Matsuo et al. ................ 370/328 |

OTHER PUBLICATIONS

Japanese Office Action mailed Aug. 2, 2011 for JP Patent Application Serial No. 2008-502154, 2 pages.
International Search Report dated Sep. 25, 2007 for PCT Application Serial No. 06/10160, 4 pages.
OA dated Dec. 26, 2008 for U.S. Appl. No. 11/378,612, 15 pages.
Japanese Office Action mailed Nov. 9, 2010 for JP Patent Application Serial No. 2008-502154, 4 pages.
IEEE, Piscataway, NJ, USA, Aug. 13, 2004, XP040384575, paragraph [2.1.2] paragraph [3.2.14].
IEEE, Piscataway, NJ, USA, Aug. 13, 2004, XP040384668, p. 15, paragraph 3.3.2.5.
Supplementary European Search Report—EP06739090—Search Authority—The Hague—Oct. 19, 2011.
Written Opinion—PCT/US2006/010160, International Search Authority—European Patent Office—Sep. 25, 2007.
European Search Report—EP12004257—Search Authority—Hague—Jul. 23, 2012.

* cited by examiner

| Frame control 702 | Duration/ ID 704 | Address 1 706 | Address 2 708 | Address 3 710 | Sequence control 712 | Address 4 714 | QoS Control 716 | HT control 718 | Frame Body 720 | FCS 722 |
|---|---|---|---|---|---|---|---|---|---|---|
| 2 | 2 | 6 | 6 | 6 | 2 | 6 | 2 | 2 | 0-2314 | 4 |

Figure 7

HT Control Field

| Bit 0 | Bit 1-2 | Bit 3-4 | Bit 5-15 |
|---|---|---|---|
| Aggregated MSDU (A-MSDU) Present | TXOP Handover Control Type | TXOP Handover Data Flow Control Type | Reserved |

Figure 8

TXOP Handover Control Types

| Bit 2 | Bit 1 | Meaning |
|---|---|---|
| 0 | 0 | No TXOP handover |
| 0 | 1 | TXOP handed to receiver station; can only be used for data back to the granting station; when receiver station is done, TXOP ends. |
| 1 | 0 | TXOP handed to receiver station; can only be used for data back to the granting station; when receiver station is done, TXOP reverts back to granting station. |
| 1 | 1 | TXOP handed to receiver station; can be used for data from receiver station to any station; when receiver station is done, receiver station decides what to do with TXOP. |

Figure 9

TXOP Handover Data Flow Control Types

| Bit 4 | Bit 3 | Meaning |
|---|---|---|
| 0 | 0 | Remaining TXOP can only be used for data of the same TID as the handover data frame |
| 0 | 1 | Remaining TXOP can only be used for data of the same AC to which the TID belongs as indicated in the TID field of the QoS control field |
| 1 | 0 | Remaining TXOP can be used for any data |
| 1 | 1 | Reserved |

Figure 11

EFFICIENT WIRELESS TRANSMISSION OPPORTUNITY HANDOFF

CROSS-REFERENCE TO RELATED APPLICATIONS

This application is a continuation of U.S. patent application Ser. No. 11/378,612, filed Mar. 18, 2006, entitled EFFICIENT WIRELESS TRANSMISSION OPPORTUNITY HANDOFF, which claims the benefit of U.S. Provisional Application Ser. No. 60/663,567, filed Mar. 18, 2005, entitled EFFICIENT WIRELESS NODE HANDOFF MECHANISM FOR ARBITRATING ACCESS TO A WIRELESS MEDIUM WITH BACKWARDS COMPATIBILITY. The above applications are incorporated herein by reference.

FIELD OF INVENTION

The present invention relates generally to improving channel utilization in wireless networks, and more particularly to efficient transmission opportunity handoffs and other high-throughput enhancements for wireless networks.

BACKGROUND

The demand for increased bandwidth in wireless networks has been relentless the past several years and shows no signs of abating. Fortunately, Airgo Networks, Inc. of Palo Alto, Calif. is developing products for wireless networks that meet these demands. In fact, these products have reached an important threshold. Networks developed by Airgo are the first to achieve the 100 Mbit data rates needed for streaming video for home entertainment and other high data-rate applications. To achieve this incredible data rate, significant improvements over conventional circuits and techniques have been developed.

Among these significant improvements are reductions in overhead required by wireless protocols. One such source of overhead in need of reduction involves the contention period where one or more stations in a wireless network vie for access to the wireless medium.

In order to avoid collisions in a wireless network, stations that need to transmit data are not allowed to transmit immediately once the network is silent. Rather, each station that needs to transmit data is required to wait a certain period of time chosen at random from a set of possible times. After this time has passed, if the channel is still silent, the station may transmit data. This process is referred to as a channel contention.

This wait time is time wasted; it is time that is not used to transmit data. Thus, what is needed are circuits, methods, and apparatus that reduce the occurrence of these channel contentions. It is also desirable that these circuits, methods, and apparatus be compatible with the inclusion of legacy devices in a network. For example, new protocols for reducing wasted time on the medium may be implemented by HT WLAN devices (high-throughput wireless LAN) while sharing the medium with legacy 11a/b/e/i/g WLAN devices. Thus, what is additionally needed are circuits, methods, and apparatus that provide signaling mechanisms to control new efficient protocols within the context of existing networks, in particular existing 802.11 networks.

SUMMARY

Accordingly, embodiments of the present invention provide circuits, methods, and apparatus that reduce the overhead in a wireless network by providing efficient transmit opportunity (TXOP) handoffs. These handoffs reduce the occurrence of contentions for access during an existing TXOP. Embodiments of the present invention transfer TXOPs using one or more bits in one or more fields in one or more frames or packets. A specific embodiment of the present invention transfers a TXOP using bits in a quality of service (QoS) frame. In particular, bits in a high-throughput (HT) control field in a QoS frame are set to identify a TXOP handoff, though HT control fields in other types of frames or packets may be used. In various embodiments, only one bit is used to identify a TXOP handoff. In other embodiments, more than one bit may be used, for example to specify certain conditions regarding the TXOP handoff. While the frame addressed by a frame typically receives the handoff, bits may be used to specify which station is receiving the TXOP handoff in situations where the station receiving the frame of data is not the station receiving the TXOP handoff.

Another exemplary embodiment of the present invention allows various conditions to be placed on a handoff by a granting station or other station or entity. For example, conditions as to where a station receiving a TXOP handoff may send data during the TXOP may be imposed. In various embodiments of the present invention, the receiving station may only transmit back to the granting station, it may transmit only to one or more specific stations, or it may transmit freely to any station.

Conditions that impose limits on what the receiving station may do with any remaining TXOP once it is done transmitting may also be included. For example, once a receiving station is done transmitting data, the TXOP may end, it may revert to the granting station, or it may be granted to the receiving station such that the receiving station is free to end it or pass it to another station with or without conditions.

Conditions may also be imposed as to what types of data may be transmitted by the station receiving a TXOP handoff. For example, a condition may be imposed that specifies that only data having the same transmission identification (TID) as the frame that includes the granting of the transmission opportunity may be transmitted. Alternately, a condition may be imposed where the receiving station can only use the remaining transmission opportunity for data having the same access category (AC) to which the TID belongs as indicated in the TID field of a QoS control field. These various conditions may be combined or omitted in any logic combination in various embodiments of the present invention.

A TXOP handoff may be included in a data packet or frame being sent to a station, or it may be separate from the data. Again, the handoff information may be included in a quality of service frame in a high throughput control field, though one or more other fields can be used. Various bits in the HT control field can specify one or more conditions such as those listed above.

In a specific embodiment of the present invention, conditions specifying where a station receiving a TXOP handoff can transmit data are combined into one field with conditions specifying where the receiving station can transfer any remaining TXOP once it is done transmitting. In this embodiment, conditions specifying data types that can be transmitted are set in a second field. These conditions may be combined in different ways and set in different fields in the HT control or other fields in various embodiments of the present invention. For example, each of these conditions may be set in a separate field, that is, three fields may be used. Alternately, only one combined field may be used.

In an 802.11 network, the HT control field may be carried in the MAC header of a packet or frame transmitted by an HT device. Other HT devices recognize this control field as being an additional signaling mechanism for HT devices. The existence of the field can be signaled through many mechanisms such as reserved bits in the "legacy MAC header." The HT control field carries bits that allow HT devices to prescribe receiver behavior to other HT devices. The field can be any length and encompass any HT enhancements, if desired, to the legacy 802.11 protocols. One benefit of the HT control field is that many signaling bits can be consolidated and accommodated while only spending a single reserved bit, or combination of bits, in the existing MAC header to identify its presence in the frame.

One significant benefit for consolidating the dynamic signaling of all HT MAC enhancements into the HT control field is to reduce the complexity of inline processing at the receiver of the MAC block. Therefore, the choice of HT control field for including all, or most of the, HT MAC enhancements not only provides the underlying mechanism but it also provides the capability for a much less complex implementation, resulting in a faster development time. Various embodiments of the present invention may include one or more of these or the other features described herein.

A better understanding of the nature and advantages of the present invention may be gained with reference to the following detailed description and the accompanying drawings.

BRIEF DESCRIPTION OF THE DRAWINGS

FIG. 7 illustrates a quality of service data frame consistent with an embodiment of the present invention;

FIG. 8 illustrates an HT control field consistent with an embodiment of the present invention;

FIG. 9 is an illustrative example of the transmit opportunity handover control types according to a specific embodiment of the present invention;

FIG. 11 illustrates transmission opportunity handoff data flow control types according to an embodiment of the present invention;

DESCRIPTION OF EXEMPLARY EMBODIMENTS

Figure 1:
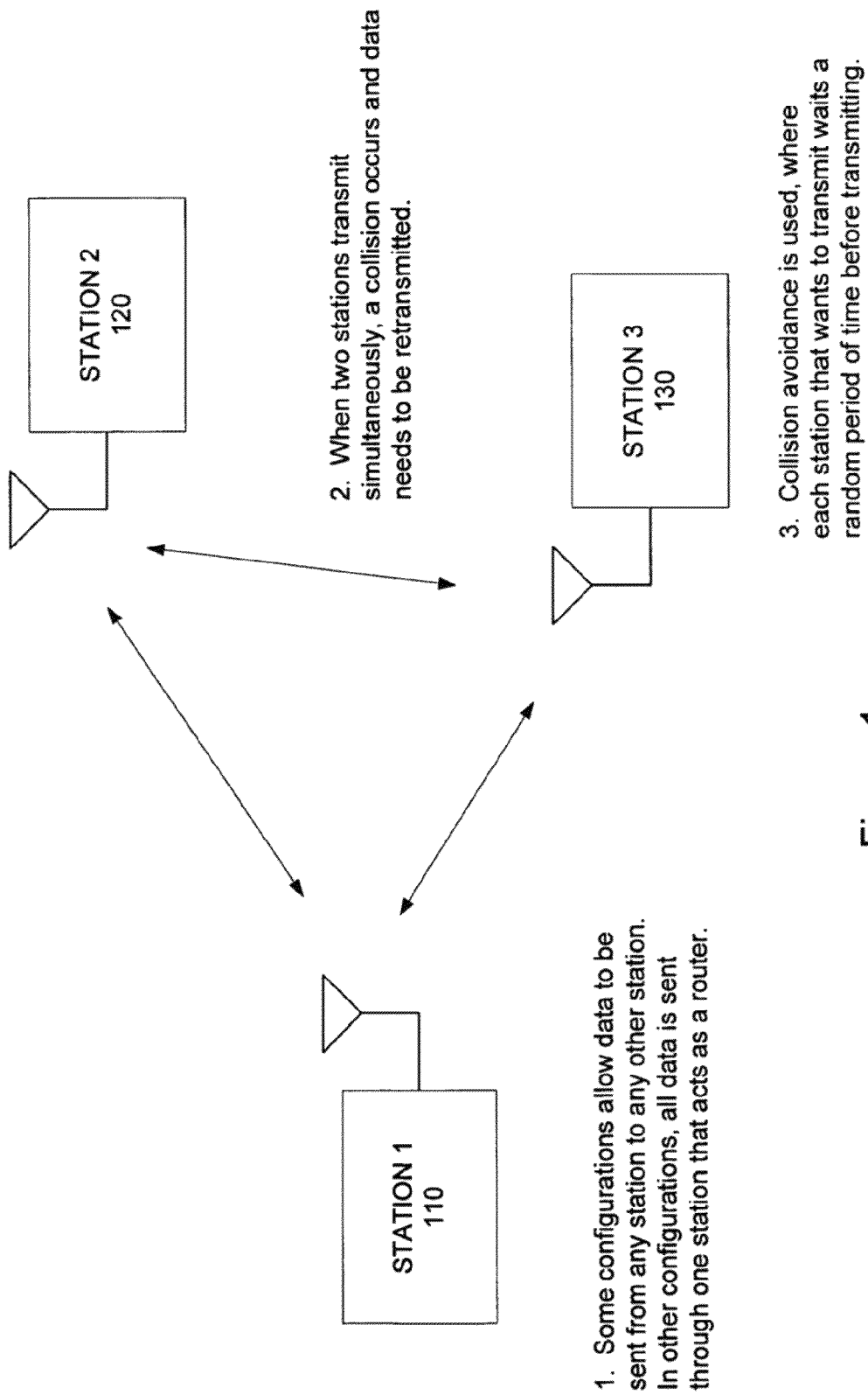
FIG. 1 is a block diagram of a wireless network that is improved by incorporating an embodiment of the present invention.

FIG. 1 is a block diagram of a wireless network that is improved by incorporating an embodiment of the present invention. This figure includes a number of wireless stations including station 1 110, station 2 120, and station 3 130. Each of these stations may be included, attached, or otherwise in communication with a computer or other type of computing device, such as a desktop, notebook, or handheld. Alternately, each of these may be included in, attached, or otherwise in communication with another type of electronic device, such as a media player or recorder, videogame console, or set-top box. One or more of these stations may be an access point, router, gateway, media extender, or other circuit. While three stations are shown in this example, in other configurations, other numbers of stations may be included, for example, 2, 4, 5, or eight stations may be included. This figure, as with the other included figures are shown for illustrative purposes, and do not limit either the possible embodiments of the present invention or the claims.

In some configurations, all three stations can transmit data to either of the other two stations. In other embodiments, for example where one station is an access point, the other stations send and receive data only to the access point station. For example, if station 1 110 is an access point, station 2 120 transmits data to station 3 130 by the first sending data to station 1 110, which in turn relays the data to station 3 130.

In other configurations, two of the three stations are HT devices and the other is a legacy device. The HT devices can transmit and receive either HT packets or legacy packets while the legacy device can only transmit and receive legacy packets.

When two stations transmit simultaneously, a collision occurs and data cannot be recovered, but needs to be retransmitted. While wired networks typically use collision detection (CD) schemes, wireless networks typically use collision avoidance (CA) methods.

The chance of a collision can be reduced by using a random back-off time. That is, following a transmission, each station that wants to transmit data waits a random period of time, within a range of possible times, before transmitting. This reduces the chance that multiple stations will begin to transmit simultaneously following a transmission. If a collision still occurs, the range of back-off times is increased and the stations that want to transmit data contend for access once again.

Accordingly, these back-off times are time periods that cannot be used for data transmission and are thus lost. This reduces overall channel capacity for the network. The use of these back-off times is shown in the following figure.

Figure 2:
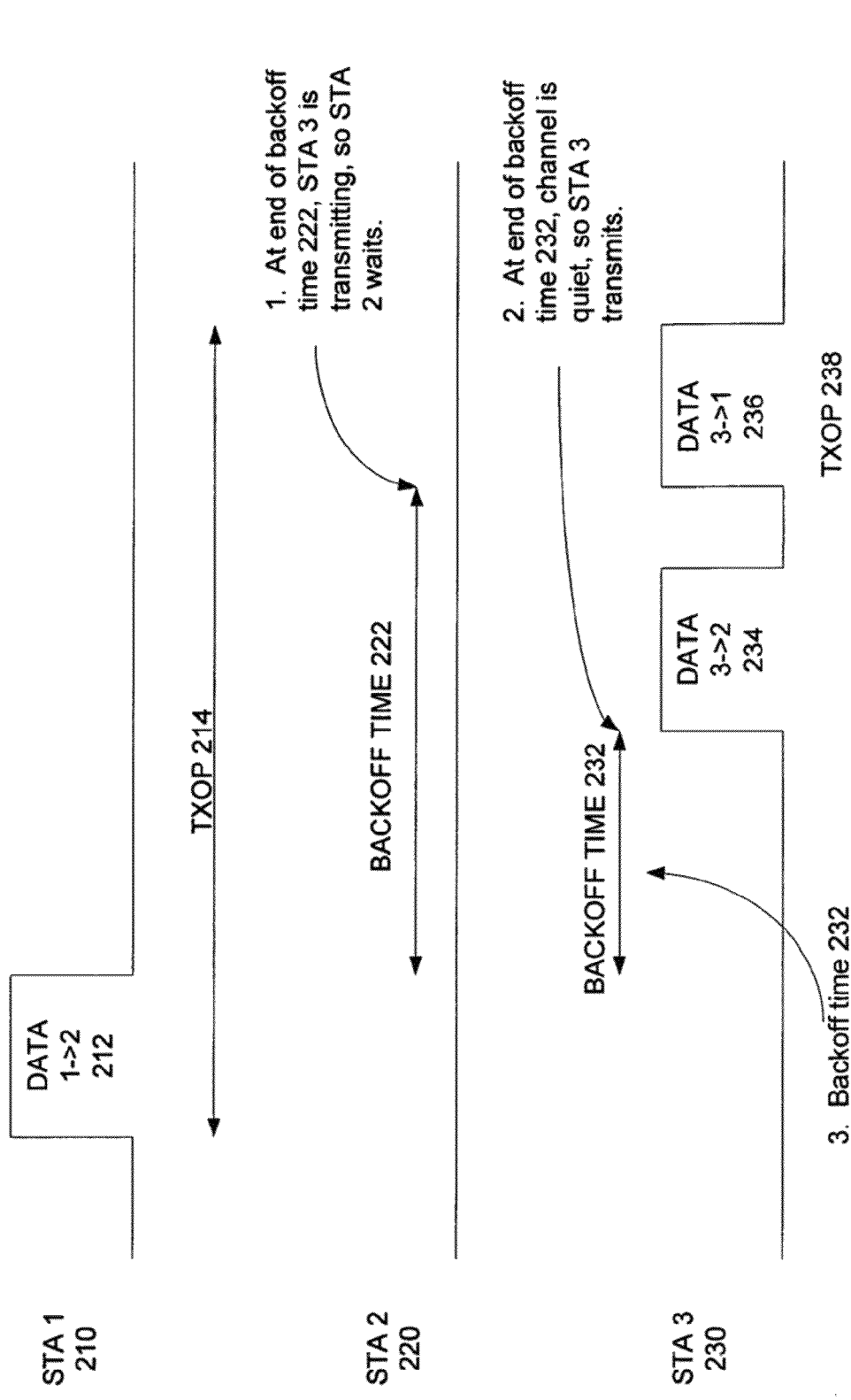
FIG. 2 is an exemplary timing diagram illustrating data transmissions in a wireless network that may be improved by incorporating an embodiment of the present invention.

FIG. 2 is an exemplary timing diagram illustrating data transmissions in a wireless network, such as of the wireless network shown in FIG. 1. Previous to this figure, station 1 210 has contended for and reserved a time slot or transmission opportunity, shown here as TXOP 214. Station 1 210 may thus transmit data during this time. Accordingly, data 212 is sent from station 1 to station 2.

Following this transmission, station 1 has no more data to transmit. Accordingly, it can surrender the remaining portion of its transmission opportunity 214. In this particular example, both station 2 220 and station 3 230 need to transmit data. Accordingly, each station selects a random back-off time from a range of possible back-off times. Following the back-off time, the station may transmit data. In this example, station 3 230 has randomly chosen a shorter back-off time than has station 2 220. Accordingly, at the end of the back off time 232, station 3 230 may transmit data, and is allocated a transmission opportunity, shown here as TXOP 238. Accordingly, station 3 230 transmits data 234 to station 2 220, and data 236 to station 1 210.

Depending on the exact wireless protocol used by the network, other time periods may be included in this figure, which are omitted here for clarity. For example, station 2 220 and station 3 230 may need to wait an amount of time following data 212 before determining that the channel is free and can be contended for.

Again, the back-off time 232 is wasted time that results in unused channel capacity. The situation is even worse, if a collision results, and station 2 220 and station 3 230 are required to select an even longer random back-off time to avoid a second collision.

Accordingly, embodiments of the present invention make use of the fact that station 1 210 has a transmission opportunity 214 during which it has exclusive right to transmit. Thus, station 1 210 may in its discretion pass this right to one of the other stations in the network. An example is shown in the following figure.

Figure 3:
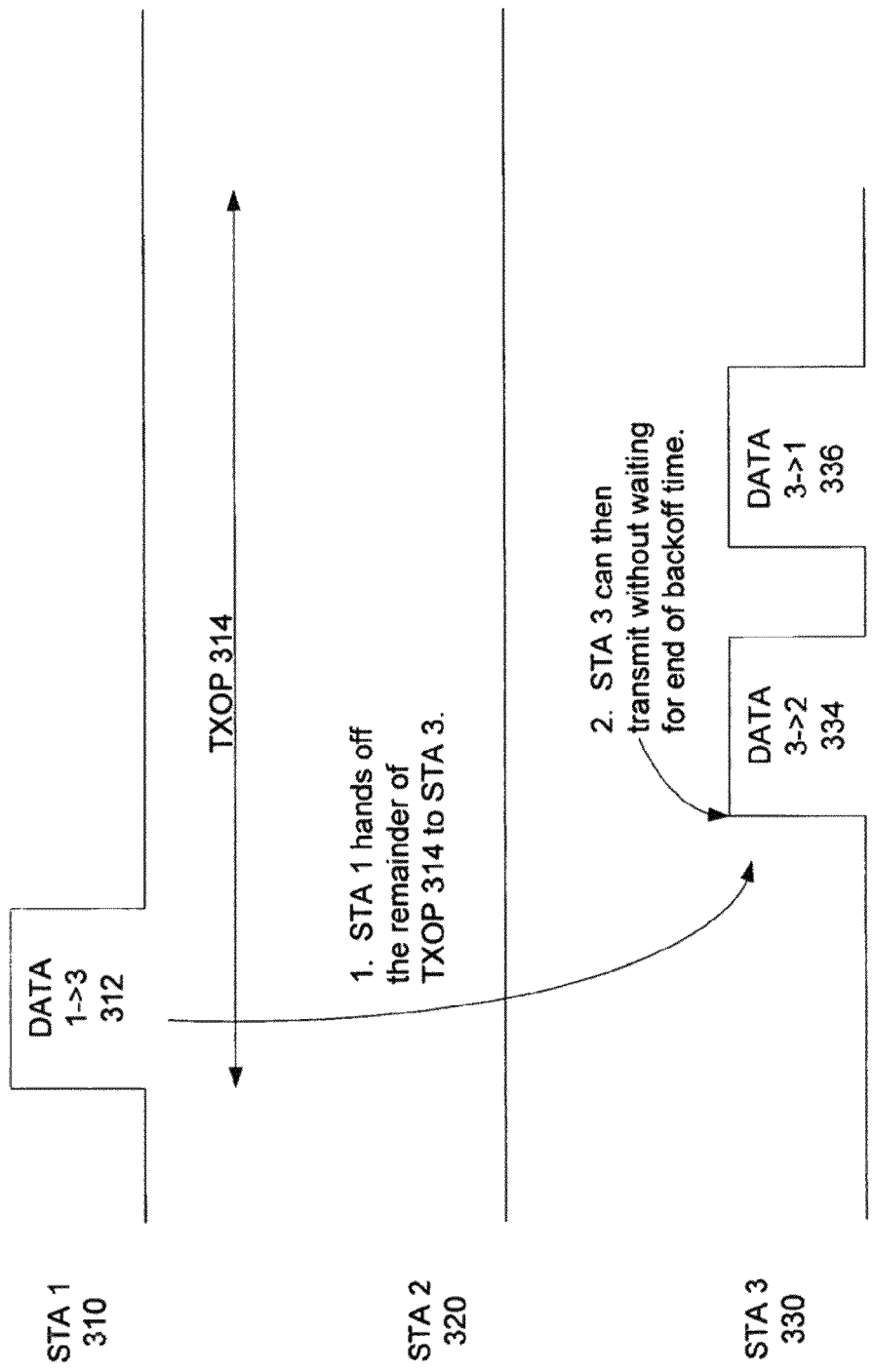
FIG. 3 is a timing diagram illustrating a transmit opportunity handoff according to an embodiment of the present invention.

FIG. 3 is a timing diagram illustrating a transmit opportunity handoff according to an embodiment of the present invention. Again, previous to the start of this timing diagram, station 1 310 has contended for and reserved a transmission opportunity, shown here as transmission opportunity 314. Accordingly, station 1 310 transmits data 312 to station 3 330. Following this transmission station 1 310 has no more data to transmit. Accordingly, it transfers the transmission opportunity to station 3 330. At that time, station 3 330 can transmit data without waiting for the end of a back-off time. Thus, in this example, station 3 330 transmits data 334 to station 2 320 and data 336 to station 1 310.

In this example, data 312 was sent from station 1 310 to station 3 330 and this data included the transfer of the transmit opportunity. In other embodiments, this handoff may be sent separately. Also, when station 1 310 transmits data to station 3 330, the data is received, though not used, by the other stations in the network, such as station 2 320. Accordingly, the transfer of the transmit opportunity does not necessarily have to be to the same station that is receiving the data, though in some embodiments of the present invention, the handoff can only be to that station receiving the data that includes that transmit opportunity transfer. Thus, in various embodiments of the present invention, a data transfer from station 1 310 to station 3 330 may include a transfer of the transmit opportunity to station 2 320.

In some circumstances, the second station may not be able to utilize all of the remaining portion (or a usable portion) of the transmit opportunity, and may thus pass it back to the original station, or to a third station. An example of this is shown in the following figure.

Figure 4:
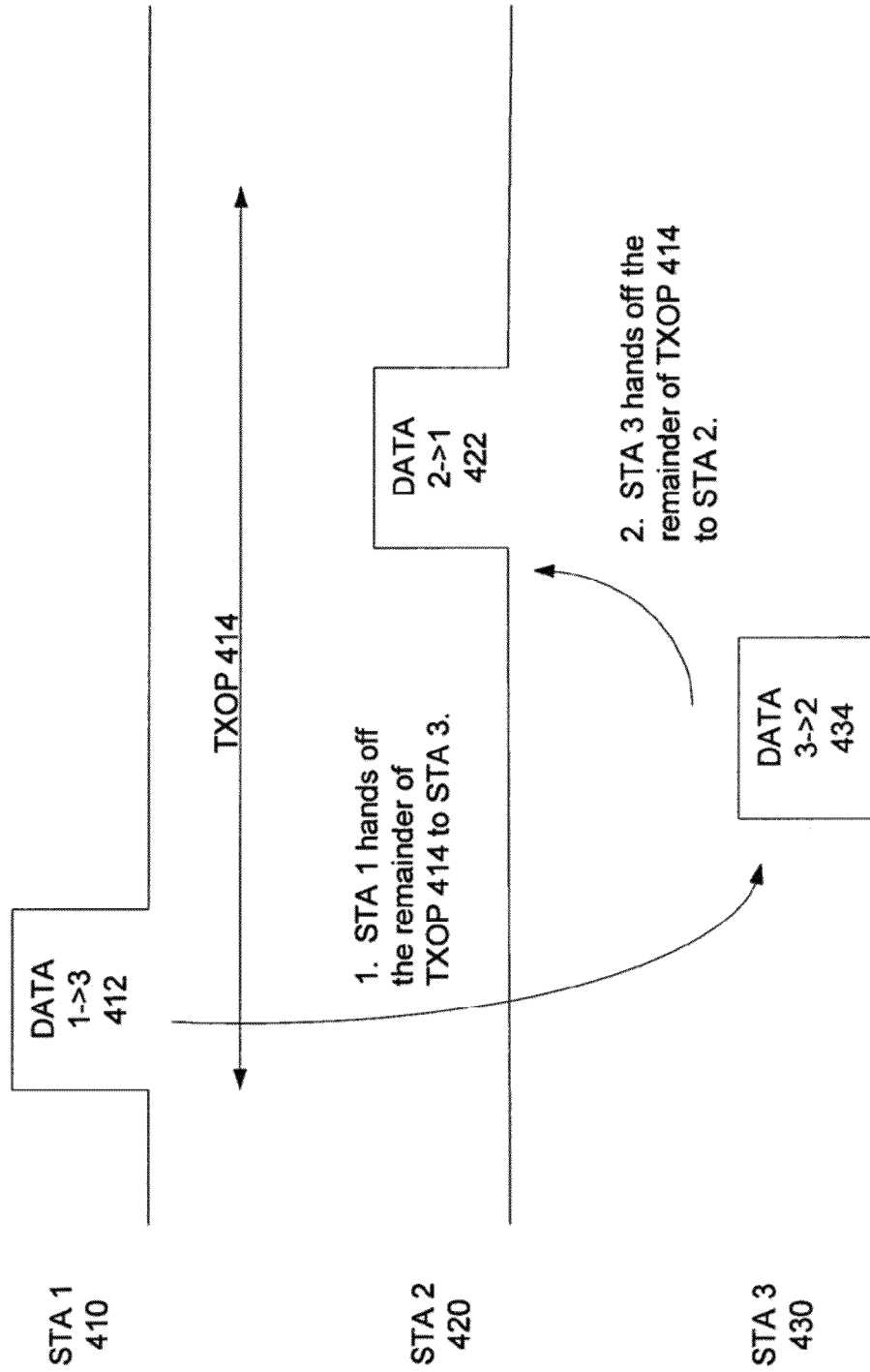
FIG. 4 illustrates transfers of a transmit opportunity among several stations in a wireless network.

FIG. 4 illustrates the transfer of a transmit opportunity among several stations in a wireless network. Again, station 1 410 has contended for and received a transmission opportunity, shown here as transmission opportunity 414. Accordingly, station 1 410 transmits data 412 to station 3 430. This data includes a transmission opportunity handoff whereby station 1 410 transfers the remainder of the transmission opportunity 414 to station 3 430.

Accordingly, station 3 430 transmits data 434 to station 2 420. However, station 3 430 realizes that a usable portion of the transmit opportunity 314 will remain unused after it has transmitted all its data. Accordingly, station 3 430 can handoff the remainder of the transmission opportunity 414 to station 2 420. Following that, station 2 420 can transmit data, in this example, data 422 is transmitted to station 1 410 from station 2 420. Other examples where a transmission opportunity is transferred are shown in the following figures.

Figure 5A:
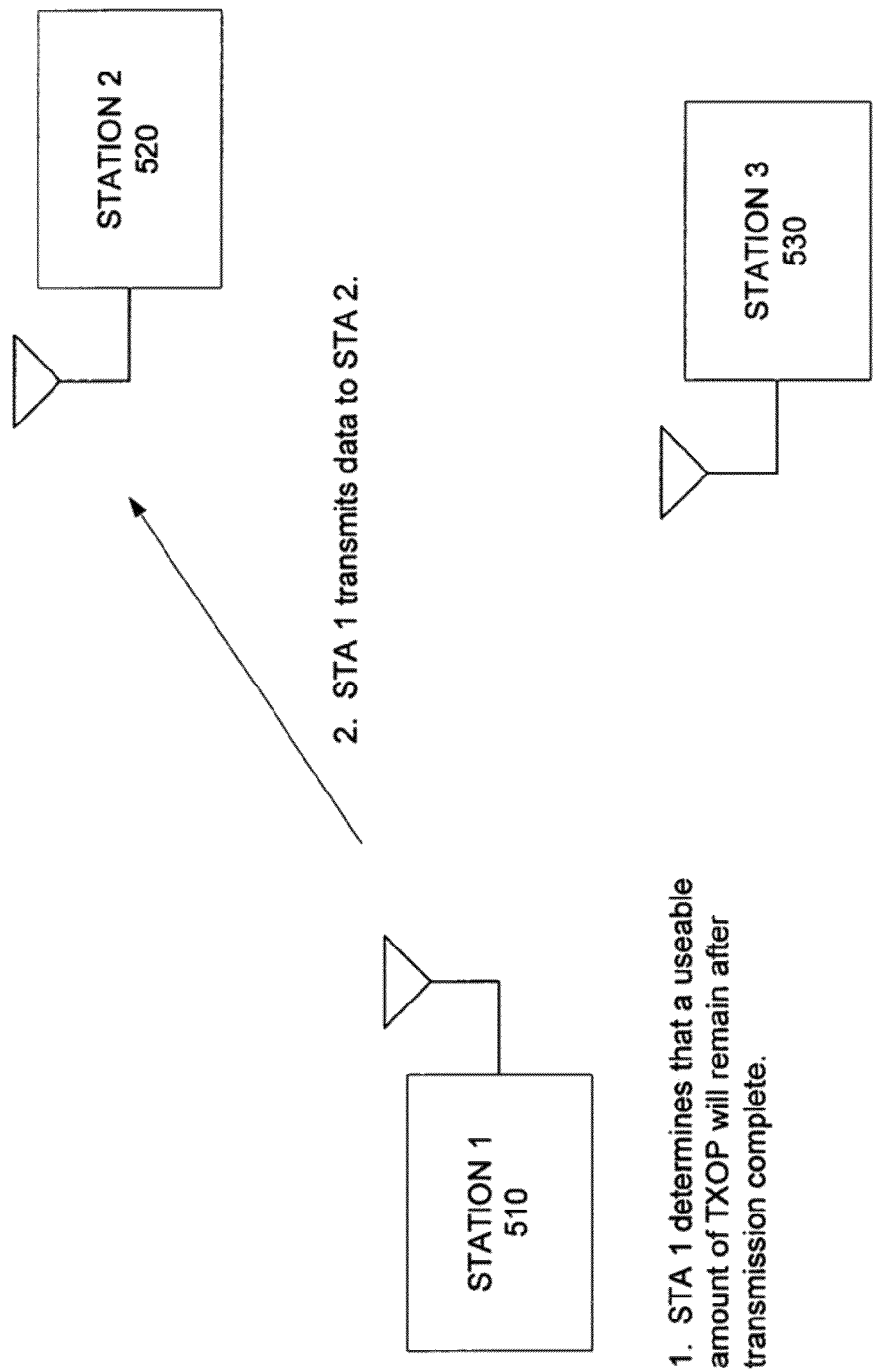
FIGS. 5A-5C illustrate a transfer of a transmission opportunity according to an embodiment of the present invention.
Figure 5B:
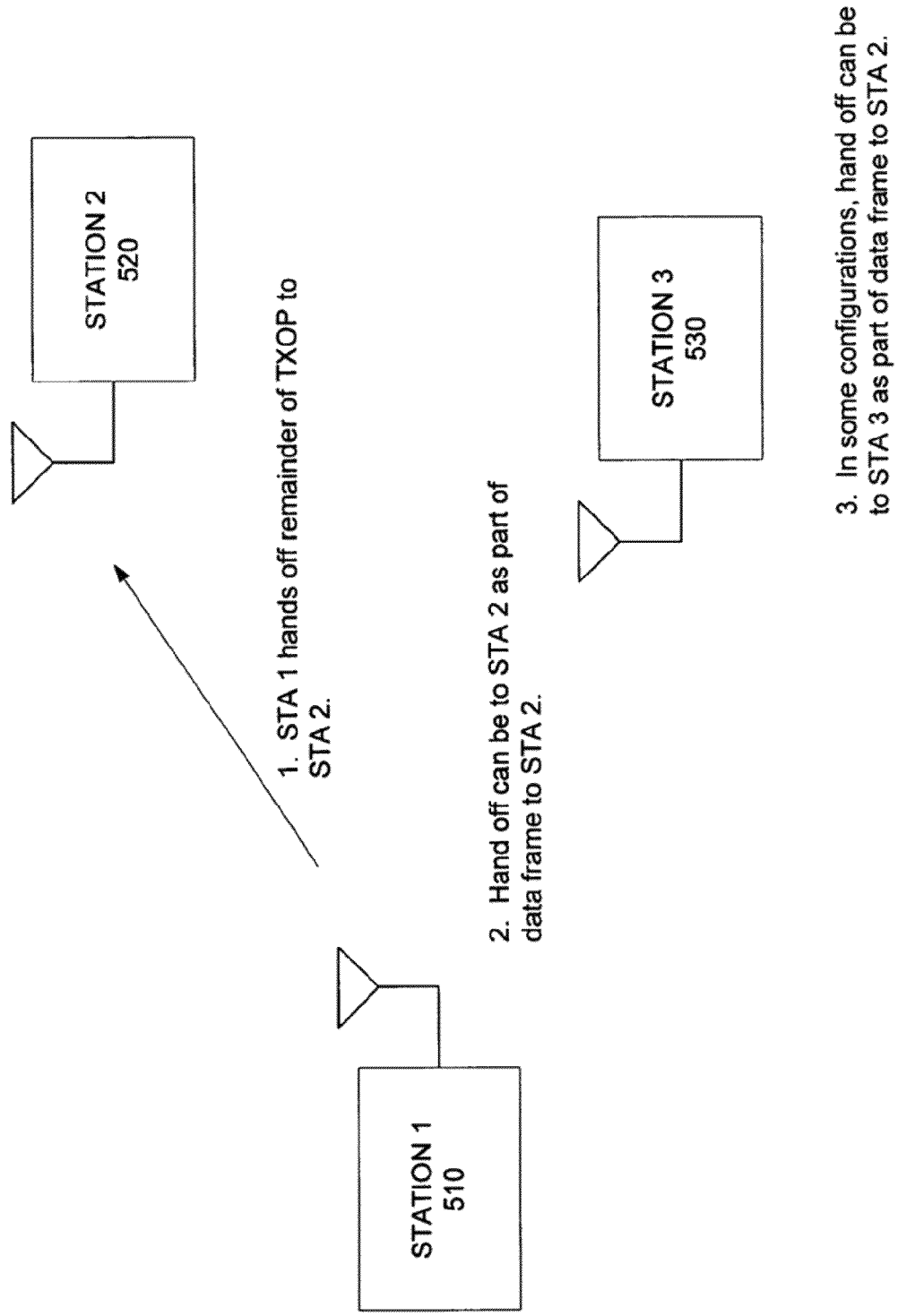
Figure 5C:
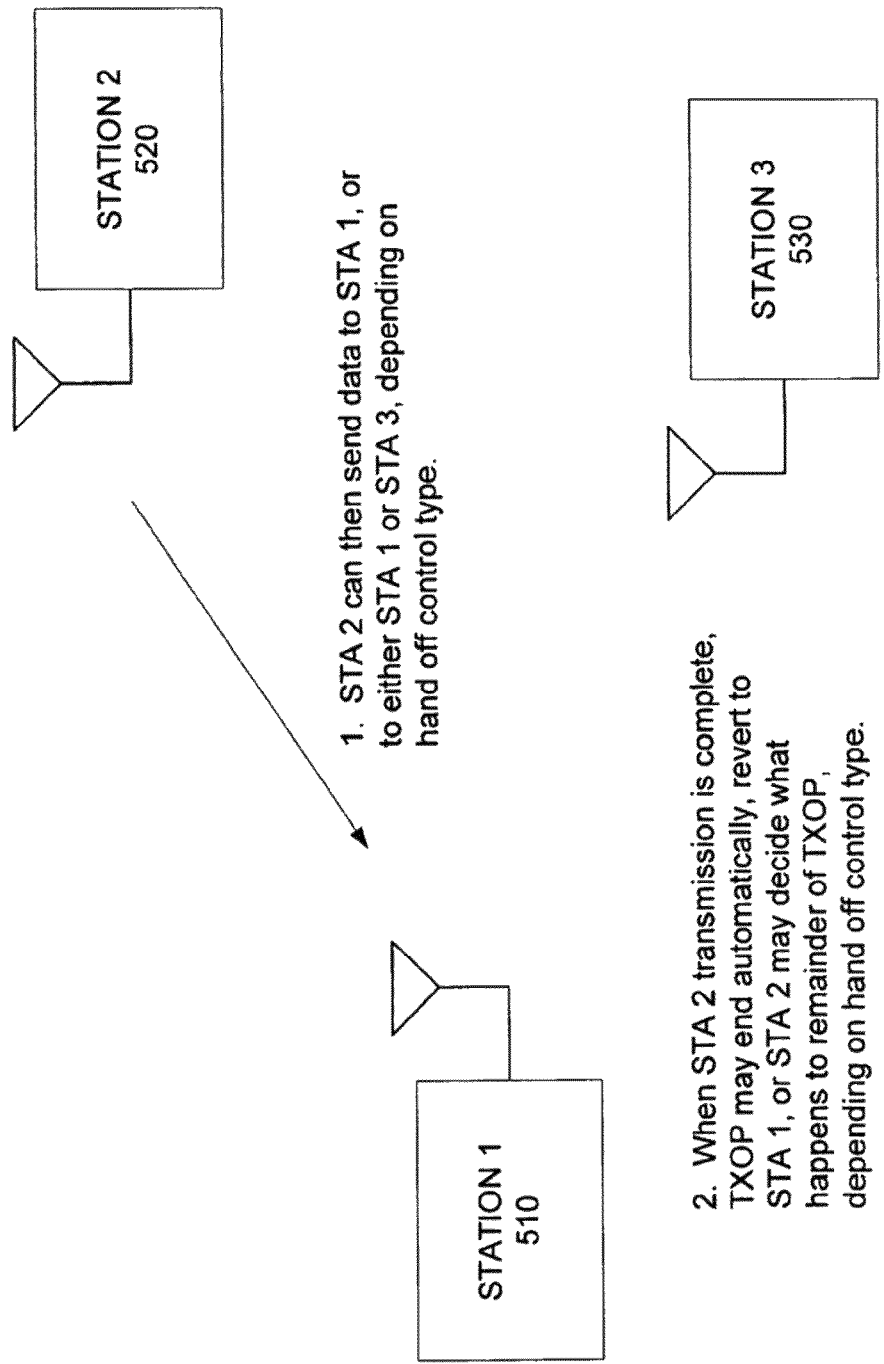

FIGS. 5A-5C illustrate the transfer of a transmission opportunity according to an embodiment of the present invention. FIG. 5A includes a number of stations, specifically station 1 510, station 2 520, and station 3 530. These stations may be the same or similar to the stations shown in FIG. 1.

In this example, station 1 510 contends for and reserves a transmission opportunity. Station 1 510 also determines, either before or after contention, that a usable amount of the transmission opportunity will remain after its transmissions are complete. In this example, station 1 510 transmits data to station 2 510.

In FIG. 5B, station 1 510 hands off the remaining portion of the transmit opportunity. Again, the transmission opportunity may be transferred to station 2 520 as part of the data that is sent to station 2 520. In a specific embodiment of the present invention, a handoff is only indicated in one data frame, and the station that is addressed in this frame is granted the TXOP. This may be true whether single frames or aggregated frames are sent. Alternately, the handoff may be to station 3 530, even though the data frame that includes the handoff is actually sent to station 2 520. In either case, the handoff is made to only one station.

In FIG. 5C, station 2 520 may then send data to station 1 510, or to either station 1 or station 3 530, depending on the handoff control type specified in the transmission opportunity handoff. When station 2 520 has completed its transmitting, the transmission opportunity may end automatically, it may revert to station 1 510, or station 2 520 may decide what to do with the remainder, depending again on the handoff control type specified in the transmission opportunity handoff.

Figure 6:
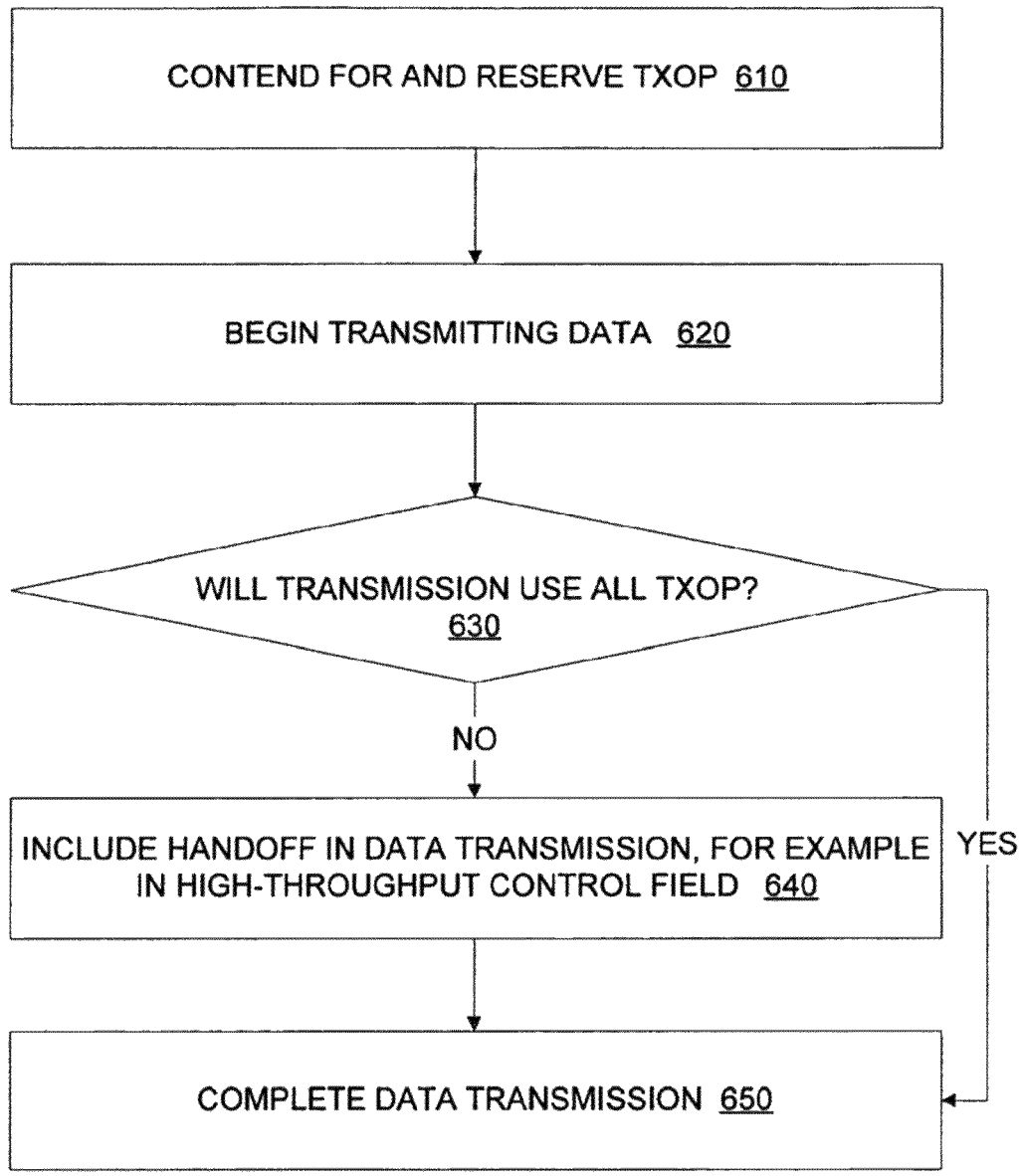
FIG. 6 is a flowchart illustrating a transmission opportunity handoff according to an embodiment of the present invention.

FIG. 6 is a flowchart illustrating a transmission opportunity handoff according to an embodiment of the present invention. In this embodiment, a transmitting station contends for and reserves a transmission opportunity. After it is determined by the station that some (or a usable portion) of the transmission opportunity will remain once the station has transmitted its data, the remainder of the transmission opportunity can be transferred or handed off to another station.

Specifically, in act 610, a transmission opportunity is contended for and reserved. In act 620, data transmission is begun. In act 630, it is determined whether all of the transmission opportunity will be used, or that a useful portion will remain. Again, this determination may be made earlier, for example even before or during contention for the channel. If no useful portion will remain, data transmission continues until completion in act 650.

If a useful portion of the transmission opportunity will remain, then a handoff may be transmitted as part of, or separate from, the data being transmitted in act 640. An HT control field or other appropriate field may carry this handoff instruction or carry bits which indicate how the handoff instruction may be interpreted through the use of other data Examples of HT fields that may carry the handoff itself as well as other HT data and information are shown below, and include but are not limited to the examples shown in FIGS. 8, 12, and 13. Again, further transfers of the transmission opportunity may be possible, depending various control values as will be described below.

Again, the transfer of a transmission opportunity may be part of the data being transferred between stations. For example, it may be part of a data frame being sent from a transmitting to a receiving station. In a specific embodiment of the present invention, the transfer or handoff is part of a quality of service (QoS) frame. An example of such a frame is shown in the following figure.

FIG. 7 illustrates a QoS data frame consistent with an embodiment of the present invention. This type of data frame might be used as the data frame for an 802.11 packet transmission. This frame includes a frame control field 702, duration/ID 704, addresses 706 708, 710, and 714, sequence control 712, QoS control 716, high throughput control 718, and FCS 722. The frame body 720 is also included. The inclusion of the HT control field may only be done by HT devices. The receiver understands the HT control field if it is an HT device and a bit or combination of bits exist to indicate the presence of the HT control field. For example, a bit in the QoS control may indicate the presence of the HT control field. Mother example is a combination of bits in the frame control and sequence control field may indicate the presence of a HT control field.

The lengths of these fields are shown in bytes and listed above each field in the figure. It should be noted that variations in these lengths, as well as the contents and arrangements of the data fields in this frame are possible. For example, the positions of the QoS control 716 and HT control 718 may be reversed, and other changes are possible. Also, the number of bytes in the QoS and HT control field may be increased to 4, 8, or 16 bytes. Similarly, the length of the frame body 720 may vary. For example, it may be between zero and 2314 bytes in length, or it may be between 0 and 2312 bytes. Also, if the HT control field is longer, for example 4, 8, or 16 bytes as mentioned above, the following frame body may be correspondingly shorter. In other embodiments of the present invention, the frame body may be shorter or longer than 2312 or 2314 bytes.

In various embodiments of the present invention, these frames may be sent at different data rates. For example, 802.11.a, 11.b, 11.g, and 11.n rates may be used. If these HT QoS data frames are intended to protect the medium like RTS-CTS, they can be sent at a lower rate.

The presence of the HT control field 718 may be indicated by setting one or more other bits in one or more fields in one or more frames. In a specific embodiment of the present invention, the presence or use of the HT control field 718 is signaled or indicated by setting one or more bits in the QoS control field 716. For example, previously reserved bit 7 in the QoS control field 716 may be set to indicate the use or inclusion of the HT control field 718. In a specific embodiment of the present invention, the HT control field may only be included in the QoS data frame if the transmitter has information to put into the field, though sending a QoS frame having an HT control field with no information is typically allowed by embodiments of the present invention.

The transfer or handoff itself may be included in one or more of these fields. Further, parts of the transfer or handoff may be included in one or more frames. In a specific embodiment of the present invention, the handoff is included in the HT control field 718. An example as such a control field is shown in the following figure.

FIG. 8 illustrates an HT control field consistent with an embodiment of the present invention. In this specific example, the HT control field is a two byte control field that includes one bit that indicates whether an aggregated MSDU is present, two bits indicating the transmit opportunity handoff control type, two bits indicating the transmit opportunity handoff data flow control type, and 11 other bits that are reserved. In other embodiments, other handoff parameters may be included, and the location and numbers of bits for these controls may vary.

When a transmission opportunity is handed off or transferred to a receiving station, the grant may be unconditional, or various limitations may be placed on the receiving station. These conditions may include limitations on the stations that the receiving station may transmit data to, limitations on what data may be transferred, and limitations on what may be done with any further remaining portion of the transmission opportunity once the receiving station is done transmitting. In other embodiments, other limitations may be imposed, and all these limitations may be combined in any logic manner.

The grant of a remaining portion of a transmission may be given without any conditions, or conditions may be imposed by either the granting station or other station, such as an access point. For example, a grant may be given without condition as to where the receiving station may send data for the rest of the transmission opportunity, or the receiving station may only be allowed to send data back to the granting station. Alternately, the station receiving the grant may only be allowed to send data to one or more specific stations.

Also, any portion of the transmit opportunity remaining after the receiving station is done transmitting may be given to the receiving station without conditions, that is, the receiving station can decide what to do with any remaining portion, for example, the transmission opportunity may be retransferred. Alternately, conditions may be imposed on the receiving station. For example, any remaining portion of the transmit opportunity may revert back to the granting station, or the transmit opportunity may simply cease after the receiving station is done transmitting.

Further, conditions as to the type of data transmitted may be optionally imposed on the receiving station. For example, transmissions may be limited to data as having the same transmission identification (TID) as the data frame including the transfer. Also, transmissions may be limited to data having the same access category to which the TID belongs as indicated in the TID field of the QoS control field. These and other controls as to destination, remainder of TXOP, data type, as well as other controls, may be included in transmission handoffs consistent with an embodiment of the present invention. For example, in a specific embodiment, the allowed AC for frames sent by a station that has been granted a TXOP is determined by 802.11e rules. Also, these conditions may be imposed in any logical combination.

The meaning of the transmit opportunity handoff control types and transmit opportunity handoff data flow control types may vary depending on the exact embodiment of the present invention. Specific examples that are consistent with an embodiment of the present invention are shown in the following figures.

FIG. 9 is an illustrative example of the transmit opportunity handoff (or handover) control types according to a specific embodiment of the present invention. These control types limit destinations where a station receiving a handoff of the transmission opportunity may transmit data. In this specific example, in the first state shown, there is no transmit opportunity handoff. That is, when these control bits are set as indicated, no transfer of the transmit opportunity occurs. Thus, these control bits should be set this way unless a handoff is desired, for example, during the last frame to be transmitted by a station during a TXOP, and a useful portion of the TXOP remains. This setting is also useful when communicating with legacy devices.

In the second state shown, the transmit opportunity handed to a receiver station can only be used for transmitting data back to the granting station. Also, when the second receiving station is done transmitting, the transmit opportunity ends. This is shown in the following figure.

Figure 10A:
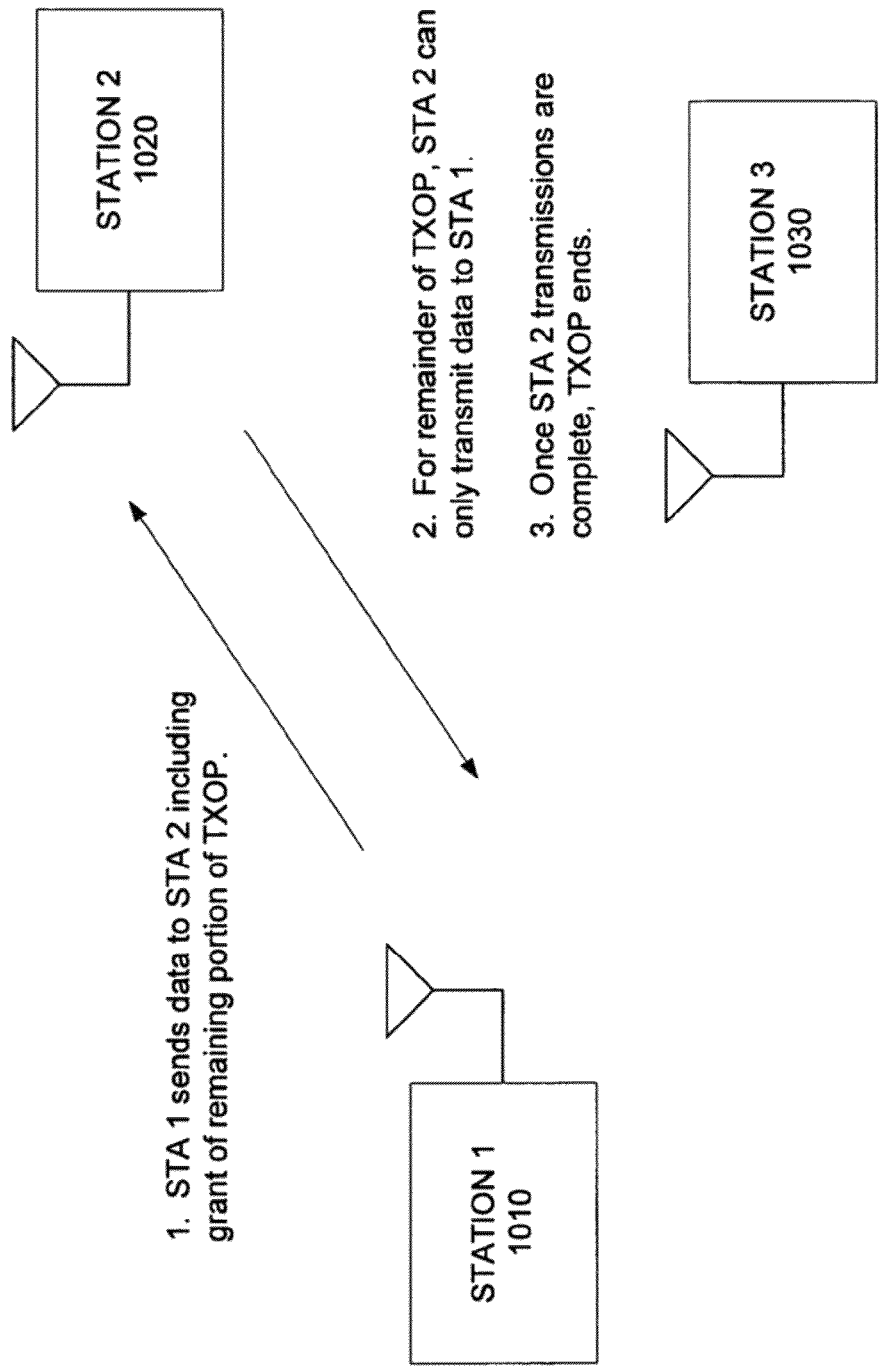
FIG. 10A-C illustrate some of the control types used by a specific embodiment of the present invention.

FIG. 10A illustrates a wireless network where a transmit opportunity is handed off to a receiving station with the condition that the transmit opportunity only be used to transmit data back to the granting station. In this example, once the receiving station's transmissions are complete, the transmission opportunity ends. Specifically, station 1 1010 transmit data including a grant of the transmit opportunity to station 2 1020. For the remaining portion of the transmit opportunity, station 2 1020 is only allowed to transmit data back to station 1 1010. Once station 2 1020 is done transmitting, the transmit opportunity comes to an end.

In the third state of the specific example shown in FIG. 9, the transmit opportunity handed off to a receiving station can only be used to send data back to the granting station. Further, when that receiving station is done transmitting, the transmit opportunity reverts back to the granting station. An example of this is shown in FIG. 10B.

Figure 10B:
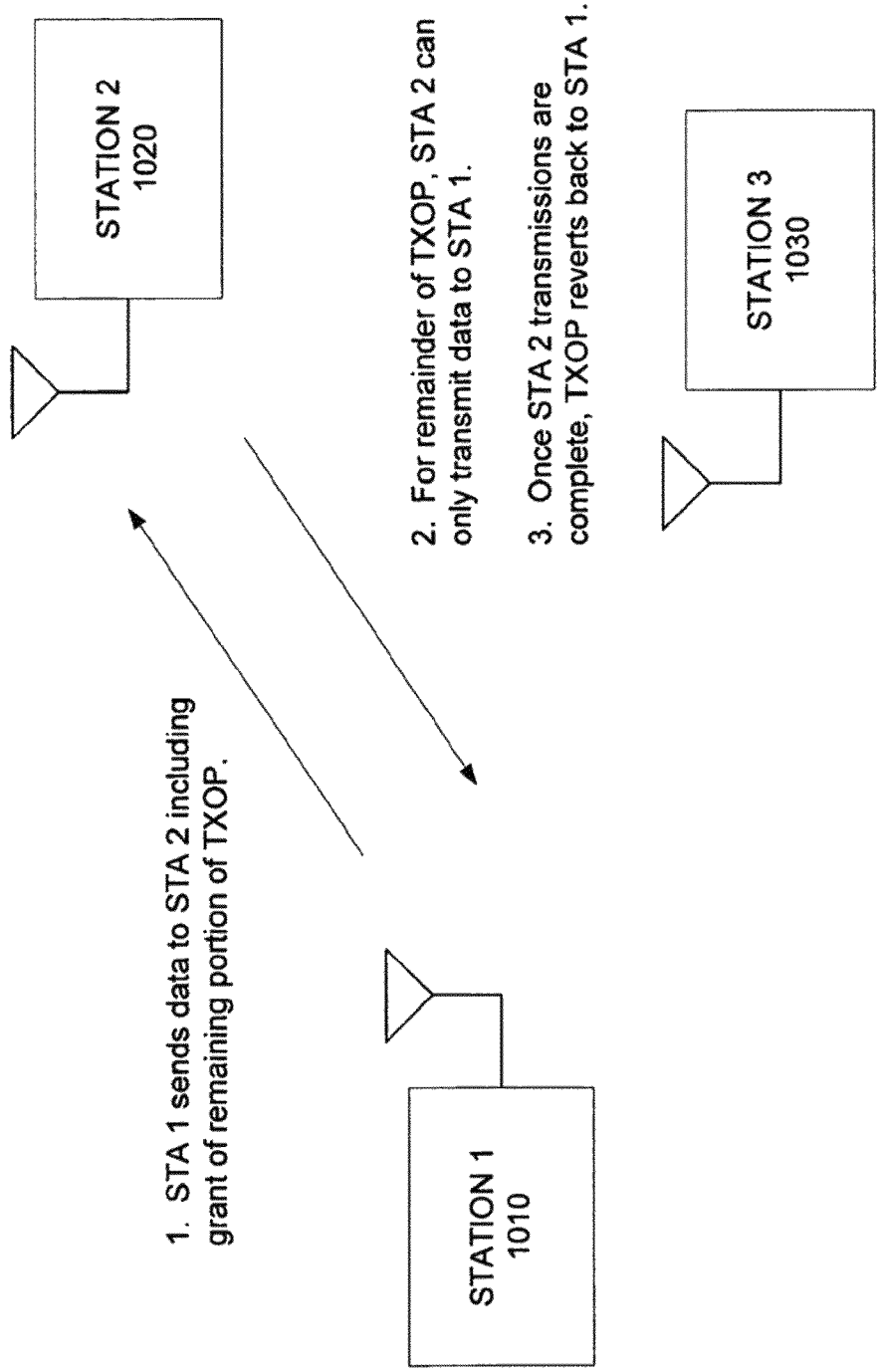

FIG. 10B illustrates a wireless network where a transmit opportunity is handed off to a receiving station with the condition that the transmit opportunity only be used to transmit data back to the granting station. In this example, once the receiving station transmissions are complete, the transmit opportunity reverts back to the granting station. Specifically, station 1 1010 transmits data including a grant of a transmit opportunity to station 2 1020. For the remaining portion of the transmit opportunity, station 2 1020 is only allowed to transmit data back to station 1 1010. Once station 2 1020 is done transmitting, the transmit opportunity reverts back to station 1 1010. This may either be done by an explicit grant back to station 1 1010, or station 1 1010 may retake the grant after it detects a period of silence greater then a threshold duration.

In the fourth state of the specific example shown in FIG. 9, the transmission opportunity handed off to the receiving station can be used to send data from the receiving station to any other station. Further, when the receiving station is done transmitting, the receiving station can decide what to do with any remaining portion of the transmit opportunity. An example of this is shown in FIG. 10C.

Figure 10C:
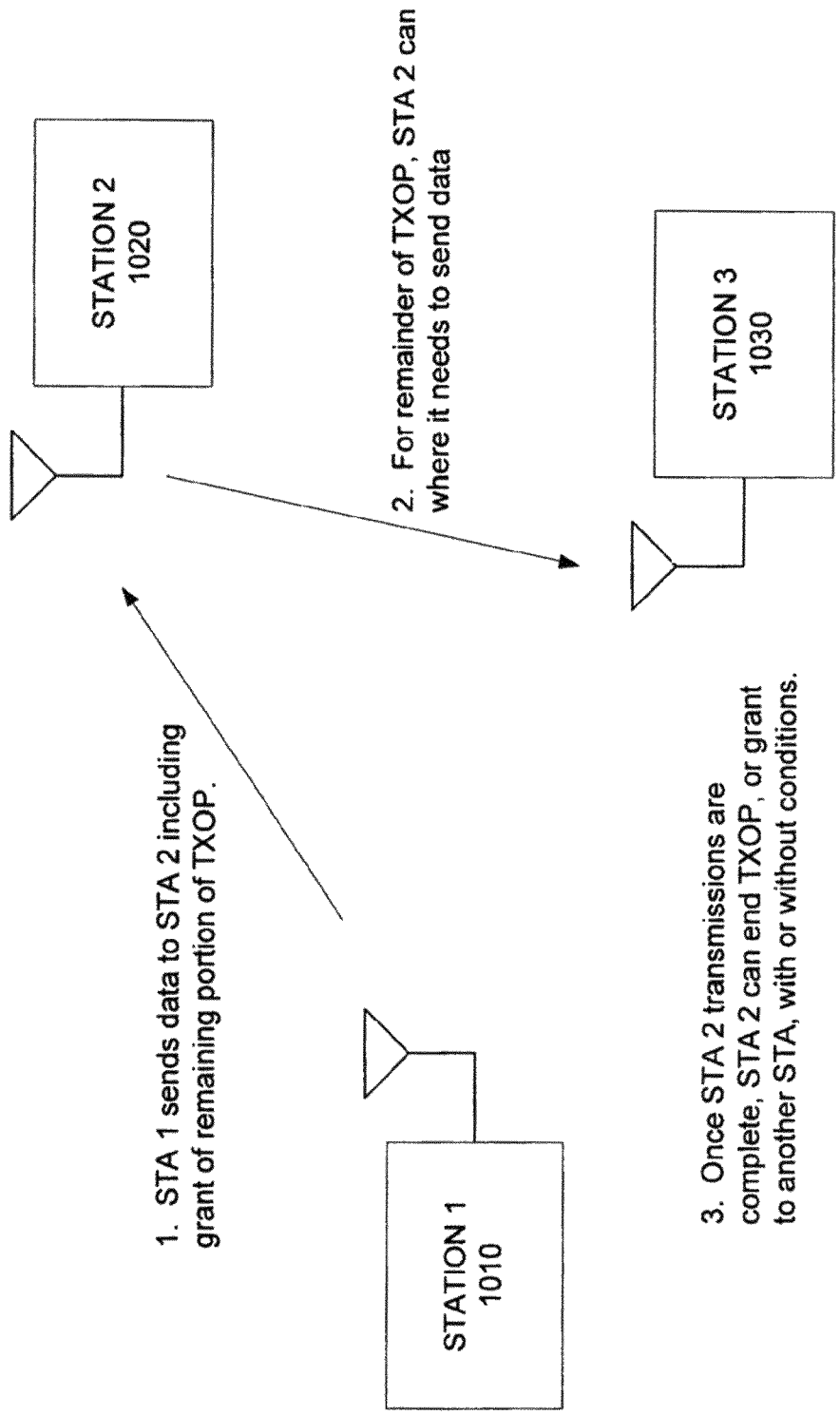

FIG. 10C illustrates a wireless network where a transmit opportunity is handed off to a receiving station without condition as to where data is sent for the remainder of the transmit opportunity. Further, once the receiving station is done transmitting, any remaining portion of the transmit opportunity is also granted without condition, and the receiving station may decide what to do with it.

Specifically, station 1 1010 transmits data including a grant of a transmit opportunity to station 2 1020. During the remaining portion of the transmit opportunity, station 2 1020 may transmit data to any other station in the network. Also, once station 2 1020 is done transmitting, it may do what it likes with any remaining transmit opportunity portion. For example it may end the transmit opportunity or it may pass of the transmit opportunity to another station, with or without conditions of the types described above.

While specific combinations of limitations are shown, other combinations and different numbers of such combinations may be utilized by various embodiments of the present invention. Also, other data bits in the HT control or other field may be used by various embodiments of the present invention.

Again, limitations as to the data types that may be transmitted by a station receiving a handoff of the transmission opportunity portion may be included. These limitations may be specified as part of the handoff itself or in some other way. In a specific embodiment of the present invention, the limitations are included in a transmission opportunity handoff data control type field as described above. A specific example is shown in the following figure.

FIG. 11 illustrates transmission opportunity handoff data flow control types according to an embodiment of the present invention. In this specific example, the control is done using two bits that translate to a total of four states, the last of which is reserved.

In the first state, the station receiving a transmit opportunity handoff can only transmit data having the same transmission identification as the frame that included the granting of the transmission opportunity.

In the second state, the receiving station can only use the remaining transmission opportunity for data having the same AC to which the TID belongs as indicated in the TID field of the QoS control field. In the final state, a remaining transmission opportunity can be used for any data.

The HT control field may include other signaling information besides aggregated MSDU and TX opportunity handoff. For example, the HT control field may carry all or most of the MAC-layer enhancements that are standardized or implemented by HT devices above and beyond earlier standards such as 802.11a/b/g/e/i. Examples of such enhancements include fast rate feedback, antenna selection, TX beam-forming calibration, sounding frame transmission requests, and other MAC-layer efficiency enhancements. Two further examples of HT control fields are shown in the following figures.

Figure 12:
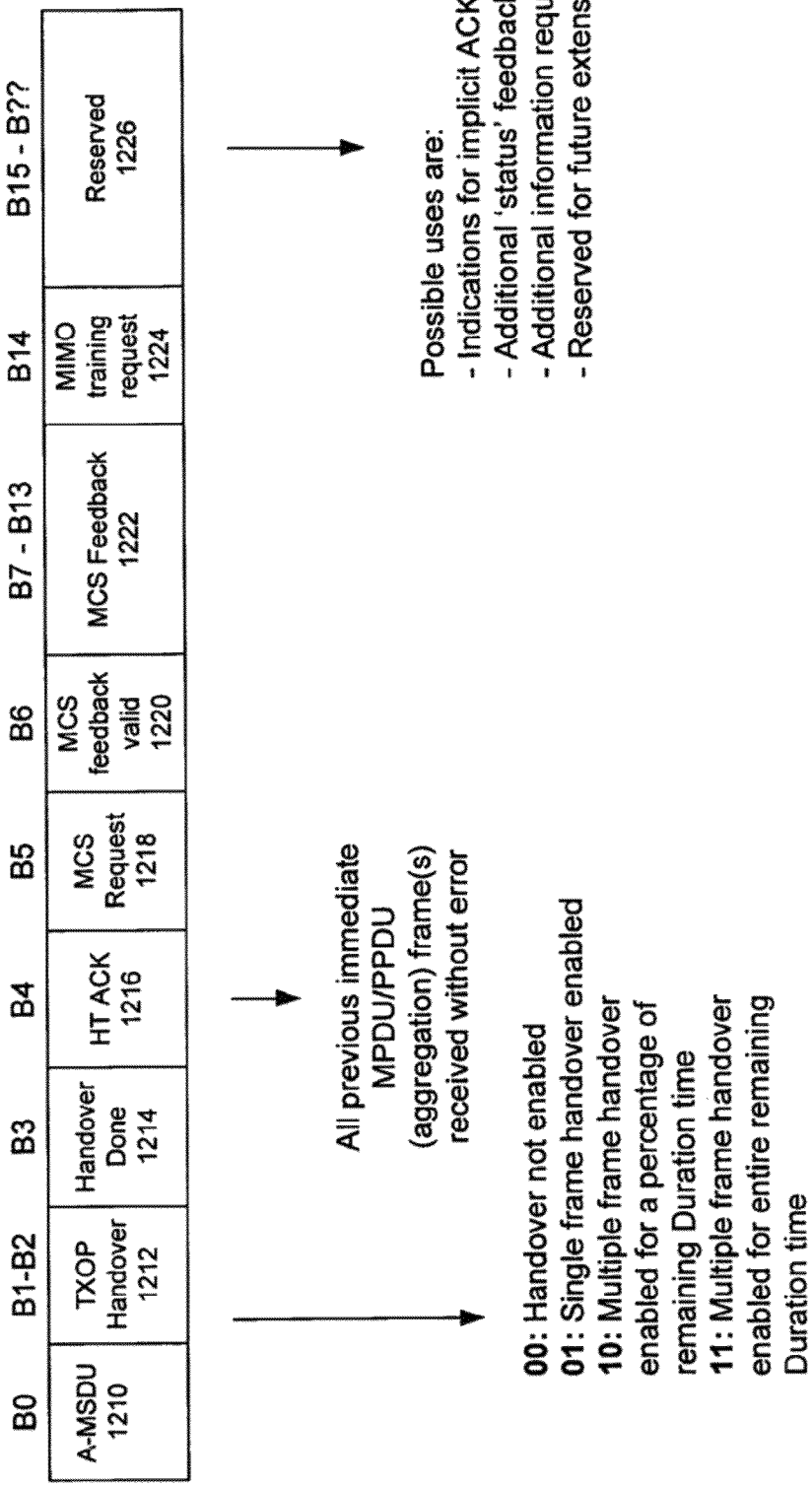
FIG. 12 illustrates another high-throughput control field that may be used consistent with an embodiment of the present invention.

FIG. 12 illustrates another high-throughput control field that may be used consistent with an embodiment of the present invention. In this example, the high-throughput control field is at least two bytes wide, where the starting and ending bits of each field is indicated. This high-throughput control field includes an A-MDSU field 1210, transmit opportunity handover field 1212, handover done field 1214, HT acknowledgment 1216, MCS requests 1218, MCS feedback valid 1220, MCS feedback 1222, MIMO training requests 1224, and reserved bits 1226.

As before, the A-MDSU bit 1210 indicates whether an aggregated MDSU frame is used.

The transmit opportunity handover 1212 is two bits long in this example, for a total of four states, though in other embodiments of the present invention it may be a different number of bits in length identifying a different number of states. In the first state, handover is not enabled. In the second state, handover is enabled, but only for a single frame. That is, if a first station hands off a transmit opportunity to a second station, the second station is only allowed to transmit one frame before the transmit opportunity reverts to the first station.

In the third state, a percentage of the remaining transmit opportunity is handed off. The percentage may be determined by specification, or set elsewhere in this or other fields. For example, a first station may handoff half of the remaining transmit opportunity time to a second station. The second station may then transmit multiple frames during this time, and at the conclusion of this percentage, the transmit opportunity reverts to the first station. In other embodiments of the present invention, instead of handing over the transmit opportunity for a percentage of time, the transmit opportunity is transferred for a set amount of time that is capped by the maximum remaining time. In the fourth state, the handover is enabled for the entire remaining portion of the transmit opportunity.

Again, a granting station may reserve a right in some remaining portion of a transmit opportunity. For example, a granting station may transfer a transmit opportunity to a receiving station, where when the receiving station is done transmitting, the transmit opportunity reverts to the original granting station. Also, as described above, the granting station may transfer the transmit opportunity for a percentage of set amount of remaining time, after which the transmit opportunity reverts back to the granting station.

When a granting station does reserve a right in some remaining portion of a transmit opportunity, the opportunity may revert to the granting station in one of a number of ways. For example, the handover done bit 1214 may be set to indicate that the receiving station is done transmitting and that the original granting station may resumed control of the transmit opportunity. Alternately, once the median has been silent for a certain amount of time, for example, the PIFS time, the granting station may take control of remaining portion of the transmit opportunity. Typically, only a granting station may use the TXOP handover field 1212 while only the receiving station uses the handover done field 1214.

The high-throughput acknowledgment field 1216 may be used to indicate that all previous immediate MPDU/PPDU frames have been received without errors. Also, an access point or station that has the capability to always send the latest recommended MCS can do so by setting the MCS feedback valid bit or frame 1220 and the related MCS feedback value in the MCS feedback field 1222. An access point or station that explicitly wants to request the MCS feedback can do so by setting the MCS request bit 1218. Typically there is no time limit (though one may be imposed) on when the MCS feedback is sent, but if an MCS request is to be made, placing the request in the MCS request field 1218 provides additional time for the responder to obtain an MCS feedback, which it may then include in an MCS feedback field 1222 in a later frame.

A sounding frame may be sent in response to the receipt of a MIMO training request in field 1224. The reserved bits 1226 may be used for various purposes, for example to indicate the use of or define an implicit acknowledgement, for additional status feedback, for additional information requests, or they may be reserved for future extensions.

The length of a high-throughput control field may be variable in various embodiments of the present invention. The length may be specified by a field in the high-throughput control field or other appropriate field. An example is shown in the following figure.

Figure 13:
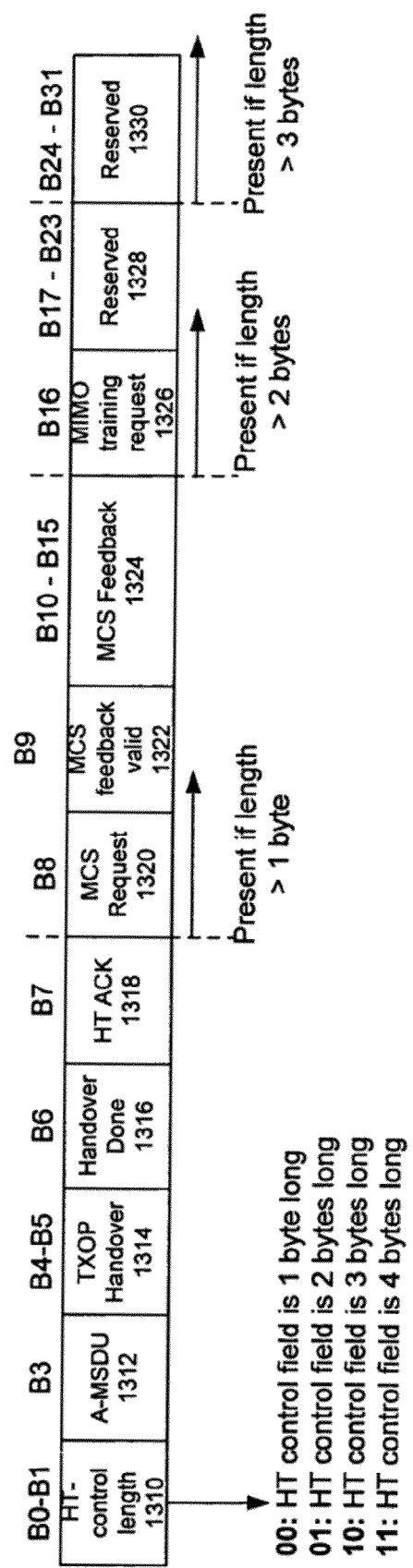
FIG. 13 illustrates another exemplary high-throughput control field according to an embodiment of the present invention.

FIG. 13 illustrates another exemplary high-throughput control field according to an embodiment of the present invention. In this high-throughput control field, a high-throughput control length field 1310 is included. In this specific example, the high-throughput control length field 1310 includes two bits, for a total of four states. In the first state, the high throughput control field is one byte long, and its length is incremented by one byte in each of the next three states. In various embodiments of the present invention, this, as with the other fields, may have a different length corresponding to different number of states, and the states may be defined in various ways. As is indicated, various fields may be included or omitted in the high-throughput control field depending on the length specified by the high-throughput control length field 1310. In other embodiments, these or other fields may be included or omitted as a function of high-throughput control length field 1310.

As can be seen from the above figures, the use of a transmit handoff mechanism according to an embodiment of the present invention greatly increases channel utilization by reducing overhead, specifically by eliminating one or more access or back-off times. Further improvement in channel utilization can be had using the improved block acknowledgment techniques also developed by Airgo Networks, Inc. These techniques are described in co-pending U.S. application Ser. No. 11/371,185, titled BLOCK ACK PROTOCOLS FOR WIRELESS PACKET NETWORKS, filed Mar. 7, 2006, which is incorporated by reference. The gains that can be had with various acknowledgment techniques and transmit opportunity handoffs consistent with embodiments of the present invention are illustrated in the following figure.

Figure 14:
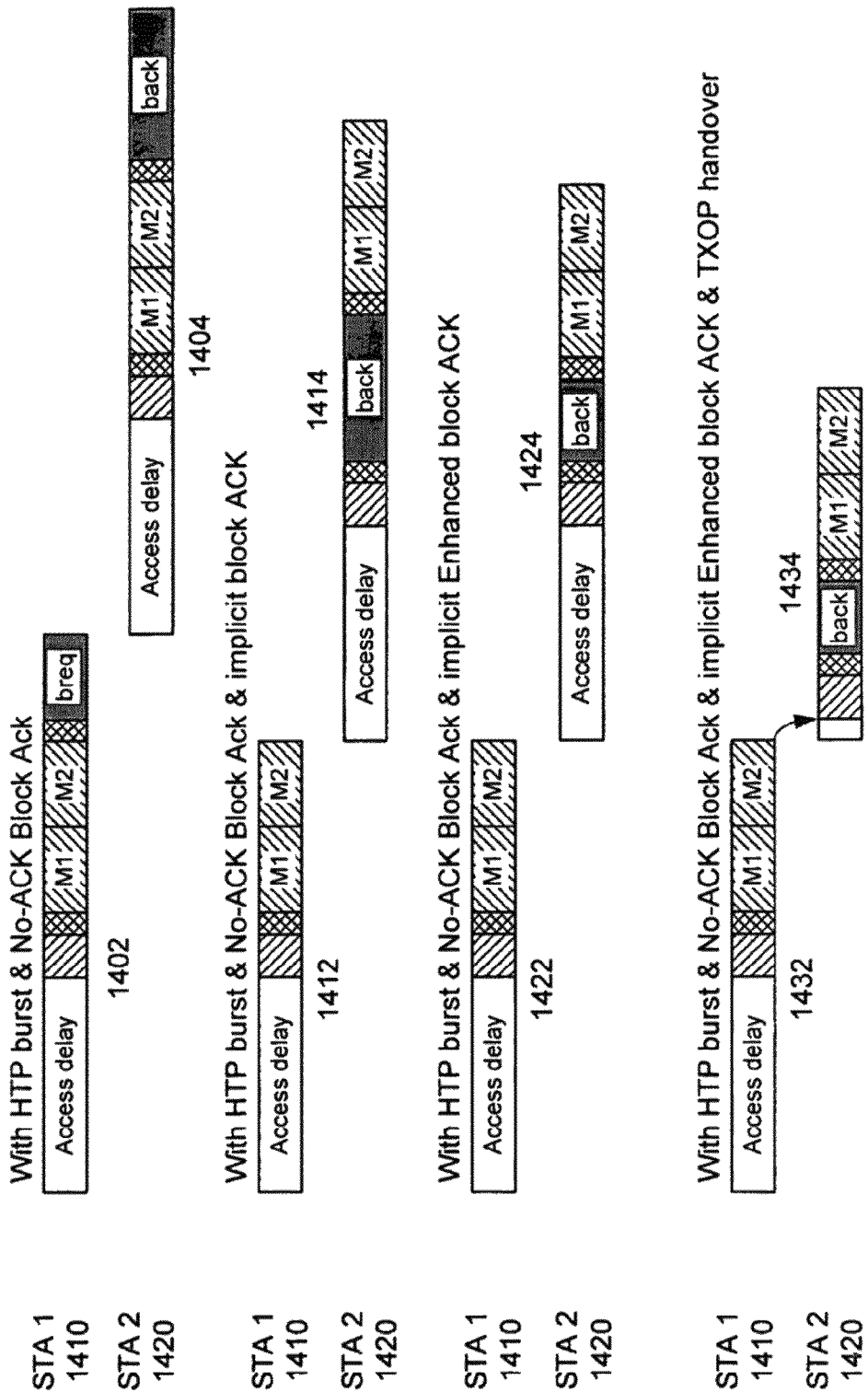
FIG. 14 illustrates the gain in channel utilization when implied acknowledgement requests, enhanced block acknowledgments, and TXOP handoffs consistent with embodiments of the present invention are utilized.

FIG. 14 illustrates the gain in channel utilization when implied acknowledgement requests, enhanced block acknowledgments, and TXOP handoffs consistent with embodiments of the present invention are utilized. In the first example, station 1 1410 transmits data at 1402 to station 2 1420. Station 2 1420 then responds by transmitting data at 1404 back to station 1 1410. Specifically, for comparison purposes, data 1402 includes a conventional block ACK request, while data 1404 includes a conventional block ACK acknowledgement. As can be seen, this transfer is the longest transfer of the included examples.

In the second example, station 1 1410 transmits data 1412 to station 2. This data does not include a block ACK request, rather the block ACK request is implied, or it may be included in the fields of data 1412. Station 2 1420 responds with a conventional block ACK acknowledgment.

In the third example, an implicit block ACK request is used, while station 2 1420 responds with an enhanced block ACK acknowledgment. For example, the enhanced block ACK acknowledgment may dynamically indicate the number of frames being acknowledged, and frames having different TIDs may be acknowledged in one ACK.

In the fourth example, an implied acknowledgment request is used along with an enhanced block ACK acknowledgment and a TXOP handoff which eliminates the access delays present in the other examples. As can be seen, the use of these novel acknowledgment and transmit handoff techniques greatly reduces the overhead needed to transmit data. The result is an increased network data rate.

Limiting the grant of a transmit opportunity such that any unused portion of the transmit opportunity reverts to the granting station is particularly useful where multiple stations are transferring voice over internet protocol (VOIP) data. An example of this is shown in the following figure.

Figure 15:
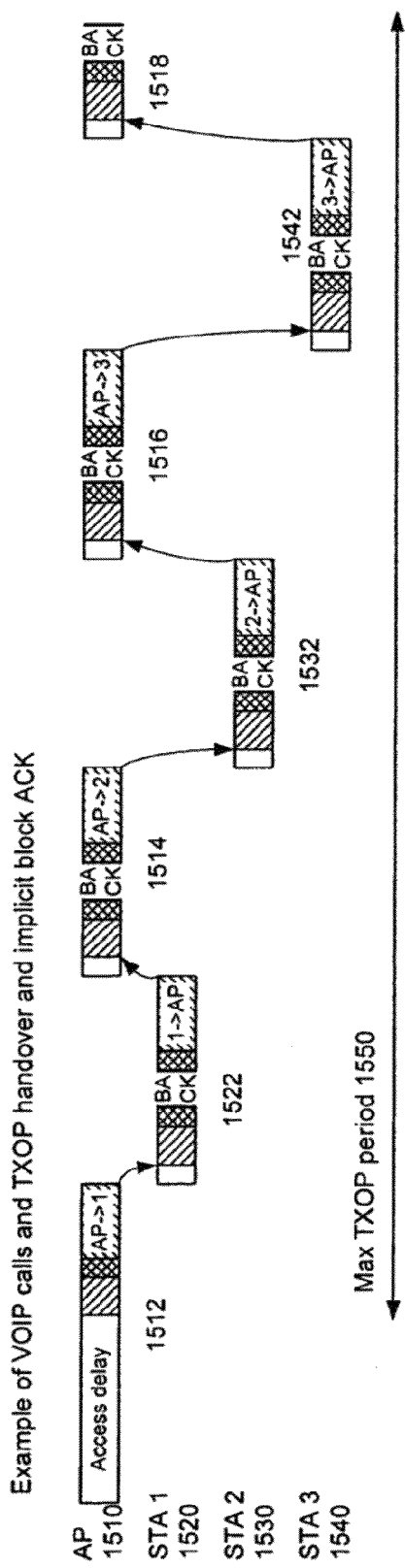
FIG. 15 illustrates three stations transferring voice over IP data via an access point.

FIG. 15 illustrates three stations transferring VOIP data via an access point. Specifically station 1 1520, station 2 1530, and station 3 1540, are transferring voice over IP data via an access point 1510. Each time a station completes its transmission, the grant of the transmit opportunity reverts back to the original granting station, in this example the access point 1510.

The efficient transmit opportunity handoffs provided by embodiment of the present invention greatly increase channel utilization during an individual transmit opportunity. However, once a transmit opportunity period is complete, stations wanting to transmit data needed to once again contend for and reserve a new TXOP. An example is shown in the following figure.

Figure 16:
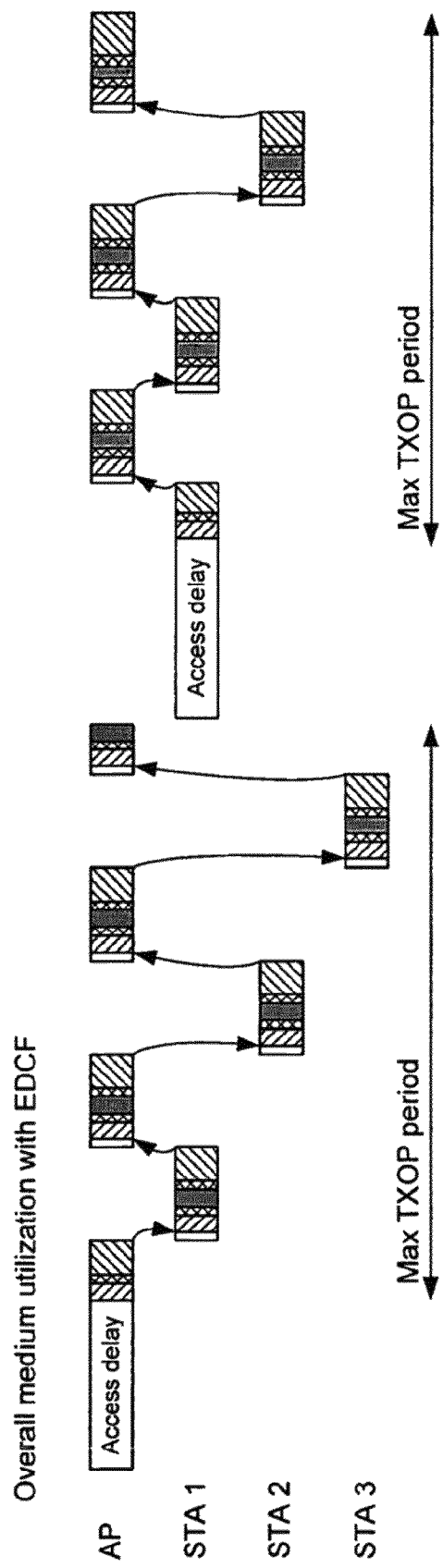
FIG. 16 illustrates data transfers during first and second transmit opportunity periods consistent with an embodiment of the present invention.

FIG. 16 illustrates data transfers during first and second transmit opportunity periods consistent with an embodiment of the present invention. During each individual transmit opportunity period, handoffs or grants provided by an embodiment of the present invention greatly increase channel utilization. However, channel utilization is reduced following the end of a transmit opportunity period, as access is contended for, and a new transmit opportunity period reserved.

Figure 17:
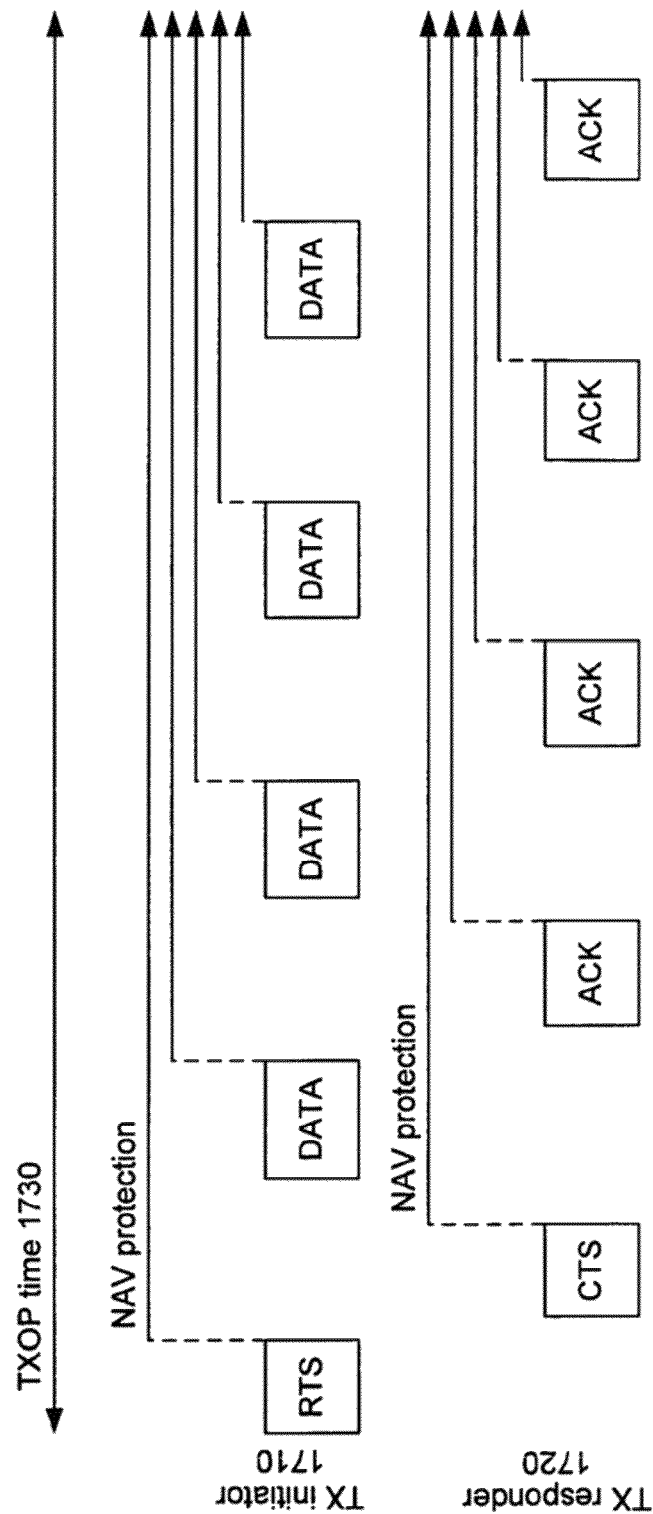
FIG. 17 illustrates data transfers between a transmit initiator and a transmit responder that may be improved by incorporating an embodiment, of the present invention.

FIG. 17 illustrates data transfers between a transmit initiator and a transmit responder that may be improved by incorporating an embodiment of the present invention. In this figure, a transmit initiator 1710 transmits a series of data frames, each of which is acknowledged in turn by a transmit responder 1720 during a TXOP 1730. These stations may be transmitting and receiving data according to the 802.11e standard, for example.

Figure 18:
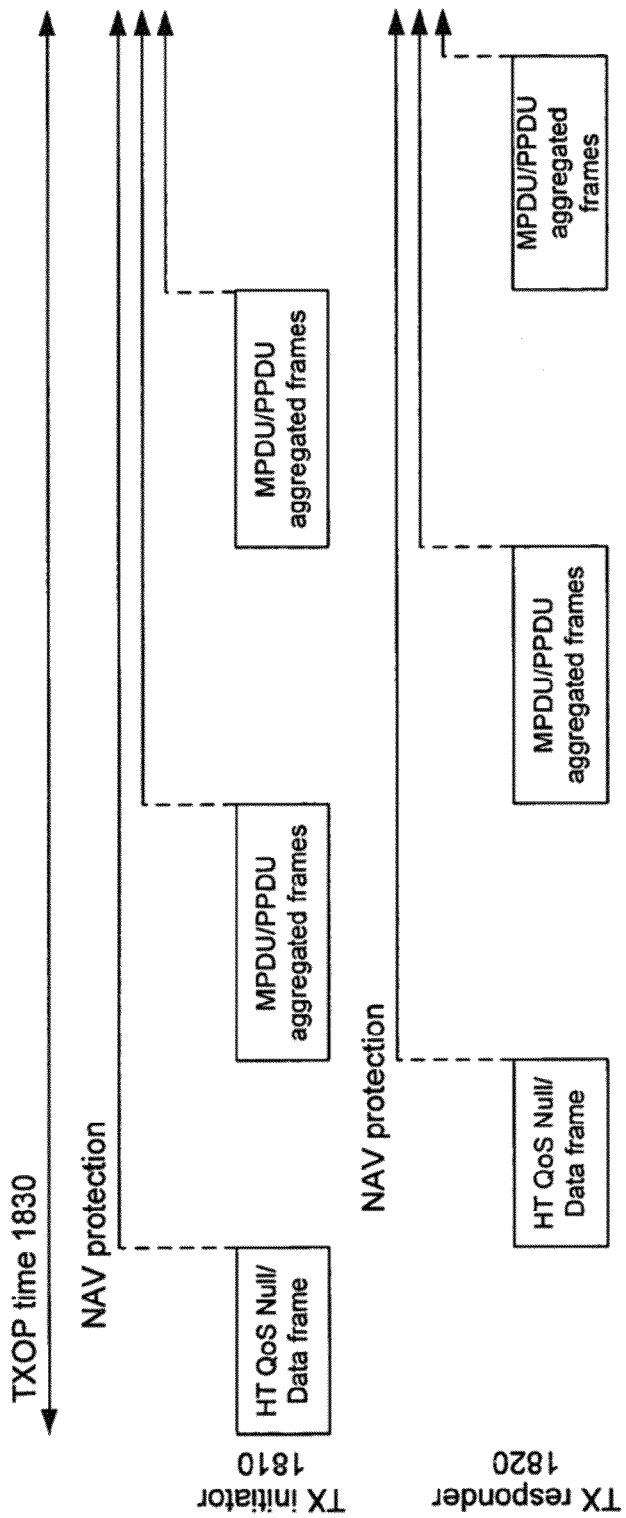
FIG. 18 illustrates data transfers between a transmit initiator and a transmit responder according to an embodiment of the present invention.

FIG. 18 illustrates data transfers between a transmit initiator and a transmit responder according to an embodiment of the present invention. In this figure, a transmit initiator 1810 and a transmit responder 1820 share a transmit opportunity 1830 to send data back and forth across the channel in accordance with an embodiment of the present invention. As can be seen, the channel utilization is much higher in the example in this figure as compared to the example shown in FIG. 17. In this example, the TXOP handover time may be derived from a duration field of a received frame, or by other mechanism. In this example, integrated MCS feedback and integrated high-throughput acknowledgments according to an embodiment of the present invention may be utilized.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The invention claimed is:

1. A wireless station for communicating in a wireless network, comprising:
    means for receiving a data frame from a second wireless station comprising a control field for consolidating signaling of high-throughput MAC enhancements, the control field being indicated with at least one reserved bit in a legacy frame format, the control field comprising handoff information associated with a transmit opportunity transfer, the transmit opportunity transfer representing a transfer, from the second wireless station to the wireless station, of an exclusive right to transmit data during a predetermined time interval, the transmit opportunity transfer including an indication of a length of the predetermined time interval for transmitting data being transferred from the second wireless station to the wireless station; and
    means for transmitting data to a third wireless station in accordance with the transmit opportunity transfer.

2. The apparatus of claim 1, wherein the control field is embedded in an 802.11 MAC frame.

3. The apparatus of claim 1, wherein the control field is embedded in a frame consistent with an 802.11 MAC format.

4. The apparatus of claim 1, wherein high-throughput devices are configured to support a wireless communication protocol having a higher throughput than that supported by legacy devices, and wherein the control field is employed by high-throughput devices.

5. The apparatus of claim 4, wherein the legacy devices are compliant with a wireless standard, wherein the wireless standard includes at least one of 802.11a, 802.11e, 802.11i, or 802.11g.

6. The apparatus of claim 1, wherein the legacy frame format is compliant with a wireless standard, wherein the wireless standard includes a least one of 802.11a, 802.11e, 802.11i, or 802.11g.

7. The apparatus of claim 1, wherein the control field is indicated through a combination of bits in a legacy frame format.

8. The apparatus of claim 7, wherein the legacy frame format is compliant with a wireless standard, wherein the wireless standard includes a least one of 802.11a, 802.11e, 802.11i, or 802.11g.

9. The apparatus of claim 1, wherein the data frame is transmitted by a device that is compliant with an 802.11n standard.

10. A wireless communication station for communicating in a wireless network, comprising:
    at least one processor configured to:
        obtain a data frame from a second wireless station that includes a control field for consolidating signaling of high-throughput MAC enhancements, the control field being indicated with at least one reserved bit in a legacy frame format, the control field comprising handoff information associated with a transmit opportunity transfer, the transmit opportunity transfer representing a transfer, from the second wireless station to the wireless station, of an exclusive right to transmit data during a predetermined time interval, the transmit opportunity transfer including an indication of a length of the time interval available for a data transmission being transferred from the second wireless station to the wireless station; and
    transmit information to a third wireless station in accordance with the transmit opportunity transfer.

11. The wireless communication apparatus of claim 10, wherein the control field is included in a medium access control (MAC) frame.

12. The wireless communication apparatus of claim 10, wherein the data frame is a quality of service frame.

13. The wireless communication apparatus of claim 10, wherein the control field that includes the transmit opportunity transfer is indicated through a combination of bits in a legacy frame format.

14. The wireless communication apparatus of claim 10, wherein the wireless communication apparatus is a high-throughput device.

15. A computer program product, comprising:
    A non-transitory computer-readable storage medium, comprising:
        code for causing at least one computer to receive at a first wireless station a data frame from a second wireless station comprising a control field for consolidating signaling of high-throughput MAC enhancements, the control field being indicated with at least one reserved bit in a legacy frame format, the control field comprising handoff information associated with a transmit opportunity transfer, the transmit opportunity transfer representing a transfer, from the second wireless station to the wireless station, of an exclusive right to transmit data during a predetermined time interval, the transmit opportunity transfer including an indication of a length of the time interval for transmitting data being transferred from the second wireless station to the wireless station; and code for causing the at least one computer to transmit data to a third wireless station in accordance with the transmit opportunity transfer.

16. The computer program product of claim 15, wherein the computer-readable medium further comprises code for causing the at least one computer to embed the control field in an 802.11 medium access control (MAC) frame.

17. The computer program product of claim 16, wherein the control field is embedded in the MAC frame in accordance with an 802.11 MAC format.

18. The computer program product of claim 15, wherein the data frame is a quality of service frame.

19. The computer program product of claim 15, wherein the legacy frame format is compliant with a wireless standard, wherein the wireless standard includes a least one of 802.11a, 802.11c, 802.11i, or 802.11g.

20. The computer program product of claim 15, wherein the control field is indicated through a combination of bits in a legacy frame format.

21. The computer program product of claim 20, wherein the legacy frame format is compliant with a wireless standard, wherein the wireless standard includes a least one of 802.11a, 802.11e, 802.11i, or 802.11g.

22. The computer program product of claim 15, wherein the data frame is received from a device that complies with an 802.11 n standard.

23. A method for communicating in a wireless network, comprising:
  receiving, at a first wireless station, a data frame from a second wireless station comprising a control field for consolidating signaling of high-throughput MAC enhancements, the control field being indicated with at least one reserved bit in a legacy frame format, the control field comprising handoff information associated with a transmit opportunity transfer, the transmit opportunity transfer representing a transfer, from the second wireless station to the first wireless station, of an exclusive right to transmit data during a predetermined time interval, the transmit opportunity transfer including an indication of a length of the predetermined time interval for transmitting data being transferred from the second wireless station to the first wireless station; and
  transmitting data to a third wireless station in accordance with the transmit opportunity transfer.

24. The wireless station of claim 1, further comprising:
  means for determining a time remaining from the time interval for transmitting data after transmitting the data to the third wireless station; and
  means for transmitting a second data frame to a fourth wireless station, the second data frame being associated with a second transfer opportunity transferring the exclusive right to transmit during the time remaining on the time interval to the fourth wireless station.

25. The method of claim 23, wherein the control field is embedded in an 802.11 MAC frame.

26. The method of claim 23, wherein the control field is embedded in a frame consistent with an 802.11 MAC format.

27. The method of claim 23, wherein high-throughput devices are configured to support a wireless communication protocol having a higher throughput than that supported by legacy devices, and wherein the control field is employed by the high-throughput devices.

28. The method of claim 27, wherein the legacy devices are compliant with a wireless standard, wherein the wireless standard includes at least one of 802.11a, 802.11e, 802.11i, or 802.11g.

29. The method of claim 28, wherein the legacy frame format is compliant with a wireless standard, wherein the wireless standard includes a least one of 802.11a, 802.11e, 802.11i, or 802.11g.

30. The method of claim 23, wherein the control field is indicated through a combination of bits in a legacy frame format.

31. The method of claim 30, wherein the legacy frame format is compliant with a wireless standard, wherein the wireless standard includes a least one of 802.11a, 802.11e, 802.11i, or 802.11g.

32. The method of claim 23, wherein the data frame is transmitted by a device that is compliant with an 802.11n standard.

* * * * *